(12) United States Patent
Freeman et al.

(10) Patent No.: US 11,629,607 B2
(45) Date of Patent: Apr. 18, 2023

(54) TURBINE SHROUD ASSEMBLY WITH RADIALLY AND AXIALLY BIASED CERAMIC MATRIX COMPOSITE SHROUD SEGMENTS

(71) Applicant: Rolls-Royce Corporation, Indianapolis, IN (US)

(72) Inventors: Ted J. Freeman, Danville, IN (US); Aaron D. Sippel, Zionsville, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/329,897

(22) Filed: May 25, 2021

(65) Prior Publication Data
US 2022/0381152 A1 Dec. 1, 2022

(51) Int. Cl.
*F01D 25/00* (2006.01)
*F01D 9/04* (2006.01)

(52) U.S. Cl.
CPC ............. *F01D 9/04* (2013.01); *F01D 25/005* (2013.01); *F05D 2220/32* (2013.01); *F05D 2240/11* (2013.01); *F05D 2240/12* (2013.01)

(58) Field of Classification Search
CPC .......... F01D 9/04; F01D 25/005; F01D 11/08; F01D 11/14; F01D 25/24; F05D 2220/32; F05D 2240/11; F05D 2240/12
See application file for complete search history.

(56) References Cited

U.S. PATENT DOCUMENTS

| | | |
|---|---|---|
| 3,066,911 A | 12/1962 | Anderson et al. |
| 4,676,715 A | 6/1987 | Imbault et al. |
| 5,203,673 A | 4/1993 | Evans |
| 5,295,787 A | 3/1994 | Leonard et al. |
| 5,405,245 A | 4/1995 | Cornelius |
| 5,459,995 A | 10/1995 | Norton et al. |
| 5,738,490 A | 4/1998 | Pizzi |
| 6,821,085 B2 | 11/2004 | Darkins, Jr. et al. |
| 6,877,952 B2 | 4/2005 | Wilson |
| 6,884,026 B2 | 4/2005 | Glynn et al. |
| 7,207,771 B2 | 4/2007 | Synnott et al. |
| 7,210,899 B2 | 5/2007 | Wilson |
| 7,416,362 B2 | 8/2008 | North |
| 7,494,317 B2 | 2/2009 | Keller et al. |
| 7,534,086 B2 | 5/2009 | Mazzola et al. |
| 7,874,059 B2 | 1/2011 | Morrison et al. |
| 8,932,009 B2 | 1/2015 | Moraines et al. |
| 8,944,756 B2 | 2/2015 | Lagueux |
| 8,985,944 B2 | 3/2015 | Shapiro et al. |
| 9,518,474 B2 | 12/2016 | Shapiro et al. |

(Continued)

OTHER PUBLICATIONS

Extended EP Search Report completed Aug. 5, 2022 and issued in connection with EP Appln. No. 22159348.6.

*Primary Examiner* — Igor Kershteyn
*Assistant Examiner* — Theodore C Ribadeneyra
(74) *Attorney, Agent, or Firm* — Barnes & Thornburg LLP

(57) ABSTRACT

A turbine shroud assembly adapted for use with a gas turbine engine includes a shroud segment and a carrier. The shroud segment extends circumferentially partway around an axis to define a gas path boundary of the turbine shroud assembly. The carrier is configured to support the shroud segment in position radially relative to the axis.

20 Claims, 15 Drawing Sheets

(56) References Cited

U.S. PATENT DOCUMENTS

| | | | |
|---|---|---|---|
| 9,587,517 B2 | 3/2017 | Vetters et al. | |
| 9,598,975 B2 | 3/2017 | Uskert et al. | |
| 9,863,265 B2 | 1/2018 | Stapleton | |
| 9,874,104 B2 | 1/2018 | Shapiro | |
| 9,926,801 B2 | 3/2018 | Uskert et al. | |
| 9,945,242 B2 | 4/2018 | Fitzpatrick et al. | |
| 9,963,989 B2 | 5/2018 | Banks et al. | |
| 10,030,541 B2 | 7/2018 | Vetters et al. | |
| 10,047,624 B2 | 8/2018 | O'Leary et al. | |
| 10,094,234 B2 | 10/2018 | O'Leary et al. | |
| 10,184,352 B2 | 1/2019 | O'Leary et al. | |
| 10,196,919 B2 | 2/2019 | O'Leary et al. | |
| 10,215,056 B2 | 2/2019 | Sippel et al. | |
| 10,301,960 B2 | 5/2019 | Stapleton et al. | |
| 10,316,687 B2 | 6/2019 | Uskert et al. | |
| 10,364,748 B2 | 7/2019 | Teixeira | |
| 10,370,994 B2 | 8/2019 | Thomas et al. | |
| 10,371,008 B2 | 8/2019 | Sippel et al. | |
| 10,378,385 B2 | 8/2019 | Tesson et al. | |
| 10,378,386 B2 | 8/2019 | Roussille et al. | |
| 10,458,268 B2 | 10/2019 | O'Leary | |
| 10,480,337 B2 | 11/2019 | Vetters | |
| 10,577,960 B2 | 3/2020 | O'Leary et al. | |
| 10,590,803 B2 | 3/2020 | Quennehen et al. | |
| 10,619,514 B2 | 4/2020 | Walston et al. | |
| 10,619,517 B2 | 4/2020 | Quennehen et al. | |
| 10,655,491 B2 | 5/2020 | Shoemaker et al. | |
| 10,655,501 B2 | 5/2020 | Lepretre et al. | |
| 10,683,768 B2 | 6/2020 | Snyder et al. | |
| 10,683,770 B2 | 6/2020 | Freeman et al. | |
| 10,689,998 B2 * | 6/2020 | Stapleton | F01D 11/08 |
| 10,690,007 B2 | 6/2020 | Quennehen et al. | |
| 10,774,008 B2 | 9/2020 | Subramanian et al. | |
| 10,815,810 B2 | 10/2020 | Barker et al. | |
| 10,858,959 B2 | 12/2020 | Maar | |
| 10,876,422 B2 | 12/2020 | O'Leary et al. | |
| 10,934,879 B2 | 3/2021 | O'Leary et al. | |
| 11,208,896 B1 * | 12/2021 | Baucco | F01D 9/065 |
| 11,215,080 B1 * | 1/2022 | Freeman | F01D 25/243 |
| 11,255,210 B1 * | 2/2022 | Freeman | F01D 5/284 |
| 11,286,812 B1 * | 3/2022 | Freeman | F01D 11/08 |
| 11,319,828 B1 * | 5/2022 | Freeman | F01D 11/08 |
| 11,346,237 B1 * | 5/2022 | Freeman | F01D 25/005 |
| 2017/0107840 A1 * | 4/2017 | Stapleton | F01D 25/246 |
| 2018/0087405 A1 | 3/2018 | Quennehen et al. | |
| 2018/0149030 A1 * | 5/2018 | Freeman | F01D 11/005 |
| 2018/0149031 A1 * | 5/2018 | Sippel | F01D 11/005 |
| 2018/0149034 A1 | 5/2018 | Roussille et al. | |
| 2018/0149041 A1 * | 5/2018 | Freeman | F01D 25/005 |
| 2018/0195401 A1 * | 7/2018 | Sippel | F16J 15/062 |
| 2018/0238188 A1 | 8/2018 | Shoemaker et al. | |
| 2018/0238193 A1 * | 8/2018 | Baucco | F01D 11/005 |
| 2018/0298773 A1 * | 10/2018 | Vetters | F01D 11/005 |
| 2018/0363506 A1 | 12/2018 | Tesson et al. | |
| 2019/0040758 A1 | 2/2019 | Quennehen et al. | |
| 2019/0040761 A1 | 2/2019 | Carlin et al. | |
| 2019/0128132 A1 | 5/2019 | Tableau et al. | |
| 2020/0080437 A1 * | 3/2020 | Clark | F01D 25/246 |
| 2020/0224544 A1 * | 7/2020 | Barker | F01D 11/08 |
| 2020/0256215 A1 | 8/2020 | Walston et al. | |
| 2021/0025284 A1 * | 1/2021 | Sippel | F01D 25/246 |
| 2021/0108532 A1 | 4/2021 | Freeman et al. | |
| 2021/0131300 A1 | 5/2021 | Arbona et al. | |
| 2021/0148244 A1 | 5/2021 | Freeman et al. | |
| 2021/0164365 A1 * | 6/2021 | Starr | F01D 11/08 |
| 2021/0172339 A1 | 6/2021 | Freeman et al. | |
| 2021/0180521 A1 | 6/2021 | Whittle | |
| 2021/0189897 A1 | 6/2021 | Sippel et al. | |
| 2021/0189909 A1 * | 6/2021 | Sippel | F01D 11/08 |
| 2021/0332714 A1 * | 10/2021 | Starr | F01D 11/08 |
| 2022/0195894 A1 * | 6/2022 | Quennehen | F01D 11/08 |

* cited by examiner

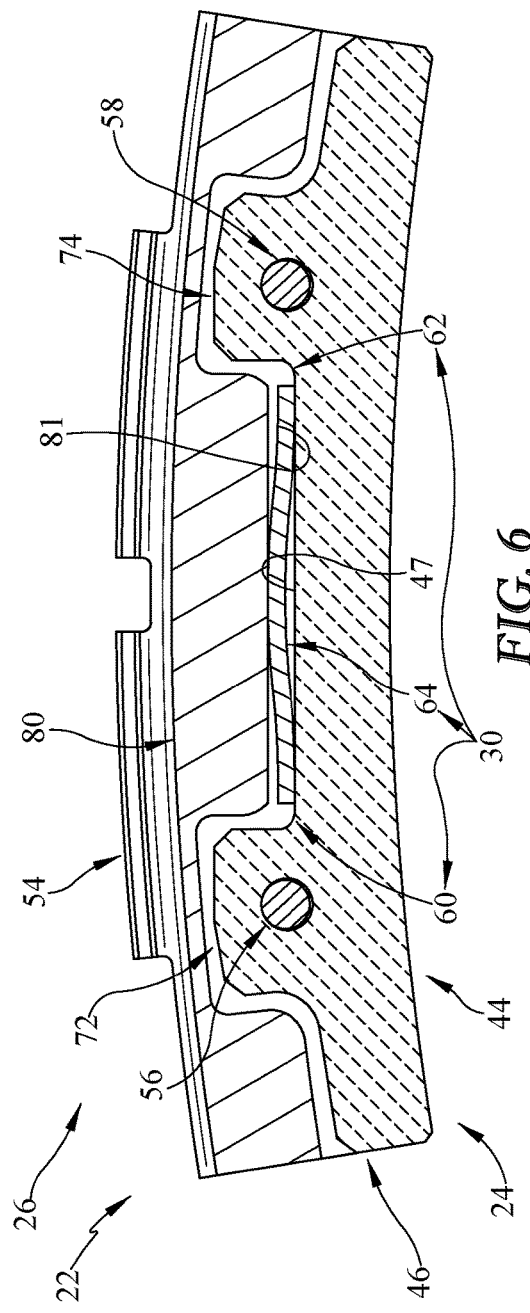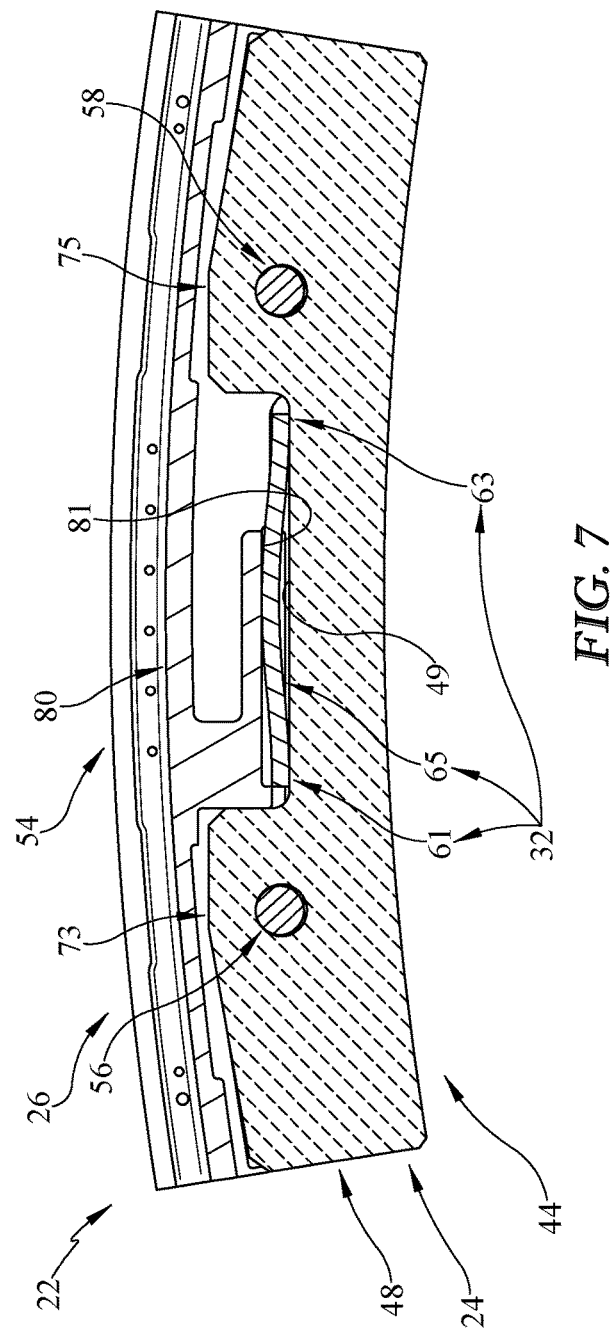

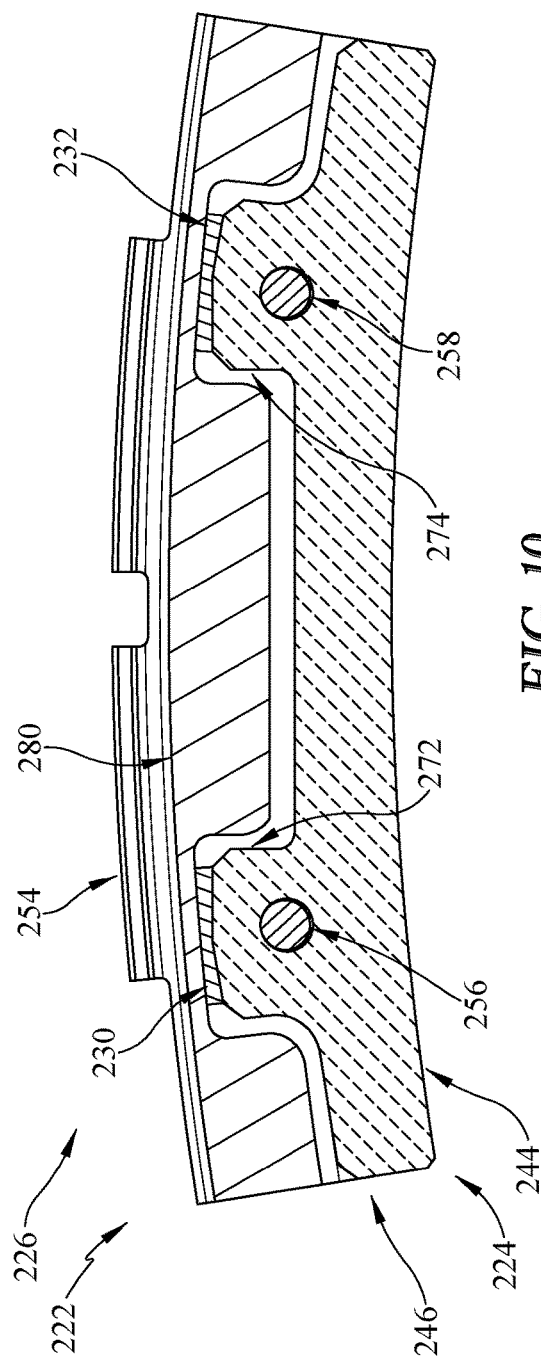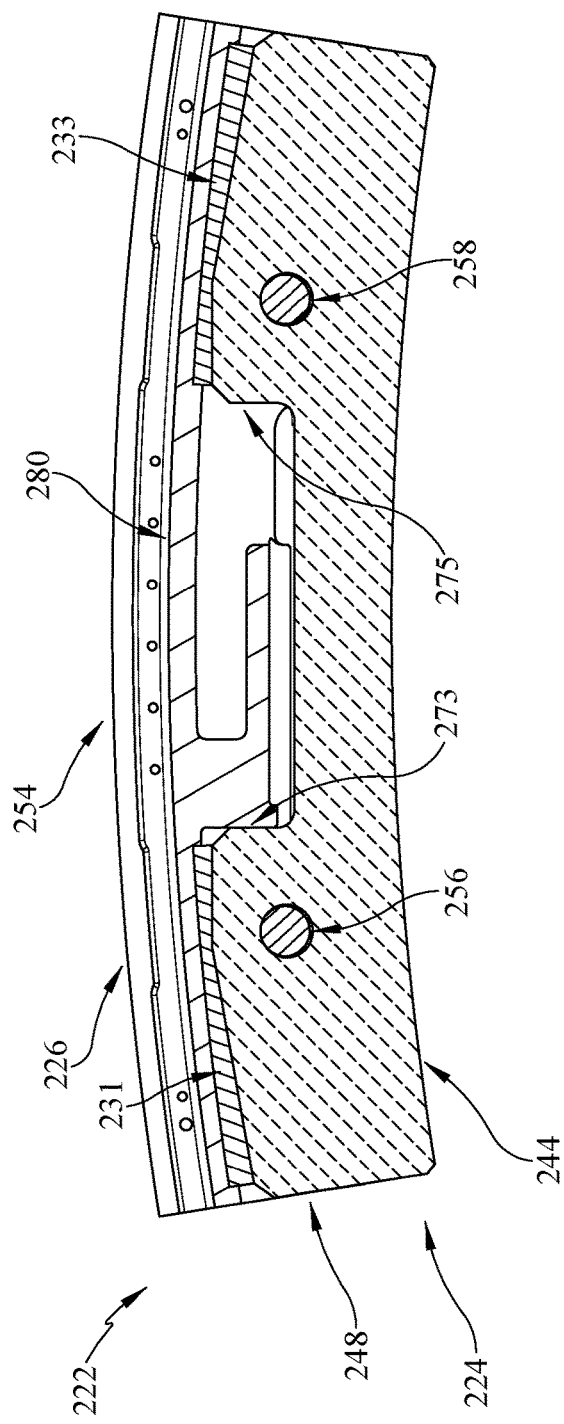

TURBINE SHROUD ASSEMBLY WITH RADIALLY AND AXIALLY BIASED CERAMIC MATRIX COMPOSITE SHROUD SEGMENTS

FIELD OF THE DISCLOSURE

The present disclosure relates generally to gas turbine engines, and more specifically to turbine shroud assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

A turbine shroud assembly for use with a gas turbine engine may include a shroud segment comprising ceramic matrix composite materials, a carrier comprising metallic materials, and a retainer system. The carrier segment may be configured to support the shroud segment in position radially relative to an axis.

In some embodiments, the shroud segment may include a shroud wall and a first attachment feature. The shroud wall may extend circumferentially partway around the axis to define a gas path boundary of the turbine shroud assembly. The first attachment feature may extend radially outward away from the shroud wall.

In some embodiments, the carrier may include a carrier segment and a pin. The pin may extend axially into the carrier segment of the carrier and the first attachment feature of the shroud segment to couple the shroud segment to the carrier segment.

In some embodiments, the carrier segment may have a body and an axial location feature. The axial location feature may extend circumferentially along and axially forward from the body. The axial location feature may engage the first attachment feature of the shroud segment.

In some embodiments, the retainer system may include a first bias member. The first bias member may extend circumferentially at least partway around the axis. The first bias member may be located axially forward of the first attachment feature of the shroud segment. The first bias member may be located radially between the shroud wall and the carrier segment so as to apply a first bias force to the shroud segment.

In some embodiments, the first bias force may be applied in a radially inward direction and an axial aft direction. The first bias force may be applied in the radially inward direction to minimize radial movement of the shroud segment relative to the carrier. The first bias force may be applied in the axially aft direction to axially locate the shroud segment on the axial location feature of the carrier segment during use of the turbine shroud assembly.

In some embodiments, the body of the carrier segment may include an outer wall, a first support arm, and a second support arm. The outer wall may extend circumferentially at least partway about the axis. The first support arm may extend radially inward from the outer wall. The second support arm may extend radially inward from the outer wall and may be spaced apart axially from the first support arm to define a cavity. The cavity may receive the first attachment feature of the shroud segment. In some embodiments, the first bias member may be located between the first support arm and the shroud wall.

In some embodiments, the first support arm may be formed to include an engagement surface. The engagement surface may engage the bias member to cause the bias member to urge the shroud segment both radially inward and axially aft.

In some embodiments, the retainer system may further include a second bias member. The second bias member may extend circumferentially at least partway around the axis. The second bias member may be located radially between the shroud segment and the carrier segment so as to apply a second bias force to the shroud segment. In some embodiments, the second bias force applied by the second bias member may be only in the radially inward direction.

In some embodiments, the shroud segment may further include a second attachment feature. The second attachment feature may be spaced apart axially from the first attachment feature. The second attachment feature may extend radially outward away from the shroud wall. The pin extend axially into the carrier segment, the first attachment feature, and the second attachment feature.

In some embodiments, the second bias member may be spaced axially forward of the first bias member and axially between the first and second attachment features. In some embodiments, the second bias member may be axially aligned with one of the first attachment feature and the second attachment feature of the shroud segment. In some embodiments, the first bias member may be located axially between the first and second attachment features.

In some embodiments, the retainer system may further include a second bias member. The second bias member may extend circumferentially at least partway around the axis. The second bias member may be located radially between the shroud segment and the carrier segment so as to apply a second bias force to the shroud segment. The second bias member may be spaced axially forward of the first bias member and axially between the first and second attachment features.

In some embodiments, the retainer system may further include a second bias member. The second bias member may extend circumferentially at least partway around the axis. The second bias member may be spaced axially forward of the second attachment feature of the shroud segment and located radially between the shroud segment and the carrier segment so as to apply a second bias force to the shroud segment in the radially inward direction and in the axial aft direction.

In some embodiments, the retainer system further includes a third bias member and a fourth bias member. The third and fourth bias members may each extend circumferentially at least partway around the axis. The third bias member may be located radially between the first attachment feature of the shroud segment and the carrier segment so as to apply a third bias force to the shroud segment. The fourth bias member may be located radially between the second attachment feature of the shroud segment and the carrier segment so as to apply a fourth bias force to the shroud segment. In some embodiments, the third and fourth bias forces may only be in the radially inward direction.

According to another aspect of the present disclosure, a turbine shroud assembly for use with a gas turbine engine may include a shroud segment, a carrier, and a retainer system. The shroud segment may include a shroud wall that extends circumferentially partway around an axis and a first attachment feature that extends radially outward away from the shroud wall. The carrier may include a carrier segment and a pin that extends axially into the carrier segment of the carrier and the first attachment feature of the shroud segment to couple the shroud segment to the carrier segment.

In some embodiments, the retainer system may include a first bias member. The first bias member may extend circumferentially at least partway around the axis. The first bias member may be located radially and axially between the shroud segment and the carrier segment. The first bias member may apply a first bias force to the shroud segment in a radially inward direction and an axially aft direction.

In some embodiments, the carrier segment may include an outer wall, a first support arm, and a second support arm. The outer wall may extend circumferentially at least partway about the axis. The first support arm may extend radially inward from the outer wall. The second support arm may extend radially inward from the outer wall. The second support arm may be spaced apart axially from the first support arm to define a cavity that receives the first attachment feature of the shroud segment. In some embodiments, the first bias member may be located between the first support arm and the shroud wall.

In some embodiments, the retainer system may further include a second bias member. The second bias member may extend circumferentially at least partway around the axis. The second bias member may be located radially between the shroud segment and the carrier segment so as to apply a second bias force to the shroud segment.

In some embodiments, the shroud segment may further include a second attachment feature. The second attachment feature may be spaced apart axially from the first attachment feature. The second attachment feature may extend radially outward away from the shroud wall. The pin may extend axially into the carrier segment, the first attachment feature, and the second attachment feature. In some embodiments, the second bias member may be spaced axially forward of the first bias member and axially between the first and second attachment features.

In some embodiments, the shroud segment may further include a second attachment feature. The second attachment feature may be spaced apart axially from the first attachment feature. The second attachment feature may extend radially outward away from the shroud wall. The pin may extend axially into the carrier segment, the first attachment feature, and the second attachment feature.

In some embodiments, the retainer system may further include a second bias member axially aligned with one of the first attachment feature and the second attachment feature of the shroud segment. In some embodiments, the first bias member may be located axially between the first and second attachment features.

In some embodiments, the retainer system may further include a second bias member. The second bias member may extend circumferentially at least partway around the axis. The second bias member may be located radially between the shroud segment and the carrier segment so as to apply a second bias force to the shroud segment. The second bias member may be spaced axially forward of the first bias member and axially between the first and second attachment features.

In some embodiments, the retainer system may further include a second bias member. The second bias member may extend circumferentially at least partway around the axis. The second bias member may be spaced axially forward of the second attachment feature of the shroud segment and located radially between the shroud segment and the carrier segment so as to apply a second bias force to the shroud segment in the radially inward direction and the axial aft direction.

According to another aspect of the present disclosure, a method may include providing a shroud segment, a carrier, and a retainer system. The carrier may include a carrier segment and a pin. The retainer system may include a first bias member.

In some embodiments, the method may further include locating the first bias member on a first radially-outwardly facing surface of the shroud segment. In some embodiments, the method may further include locating the shroud segment adjacent to the carrier segment so that the first bias member is located radially between the carrier segment and the first radially-outwardly facing surface of the shroud segment.

In some embodiments, the method may further include inserting the pin axially into the carrier segment and the shroud segment to couple the shroud segment with the carrier segment. In some embodiments, the method may further include applying a first bias force to the shroud segment in a radially inward direction and an axially aft direction. The first bias force may be applied in the radially inward direction to minimize radial movement of the shroud segment relative to the carrier. The first bias force may be applied in the axially aft direction to axially locate the shroud segment on an axial location feature formed on the carrier segment.

In some embodiments, the retainer system may further include a second bias member. The method may further include locating the second bias member on a second radially-outwardly facing surface of the shroud segment before locating the shroud segment adjacent to the carrier segment. The second bias member may be located on the second radially-outwardly facing surface of the shroud segment so that the second bias member is located radially between the carrier segment and the second radially-outwardly facing surface once the shroud segment is located adjacent to the carrier segment.

These and other features of the present disclosure will become more apparent from the following description of the illustrative embodiments.

BRIEF DESCRIPTION OF THE DRAWINGS

FIG. 6 is a cross-section view of the turbine shroud assembly of FIG. 3 taken along line 6-6 showing the first bias member is shaped to define a wave shape including a first end engaged with the shroud segment, a second end spaced apart circumferentially from the first end and engaged with the shroud segment, and a body that extends between the first and second ends and engaged with the carrier segment circumferentially between the first and second ends;

FIG. 7 is a cross-section view of the turbine shroud assembly of FIG. 3 taken along line 7-7 showing the second bias member has a wave shape similar to the first bias member and is circumferentially retained between mount posts included in the second attachment feature;

FIG. 10 is a cross-section view of the turbine shroud assembly of FIG. 8 showing the first attachment feature includes two mount posts spaced apart circumferentially from each other and each mount post has one bias member located radially between the corresponding mount post and the carrier;

FIG. 11 is a cross-section view of the turbine shroud assembly of FIG. 8 showing the second attachment feature includes two mount posts spaced apart circumferentially from each other and each mount post has one bias member located radially between the corresponding mount post and the carrier;

DETAILED DESCRIPTION OF THE DRAWINGS

Figure 1:
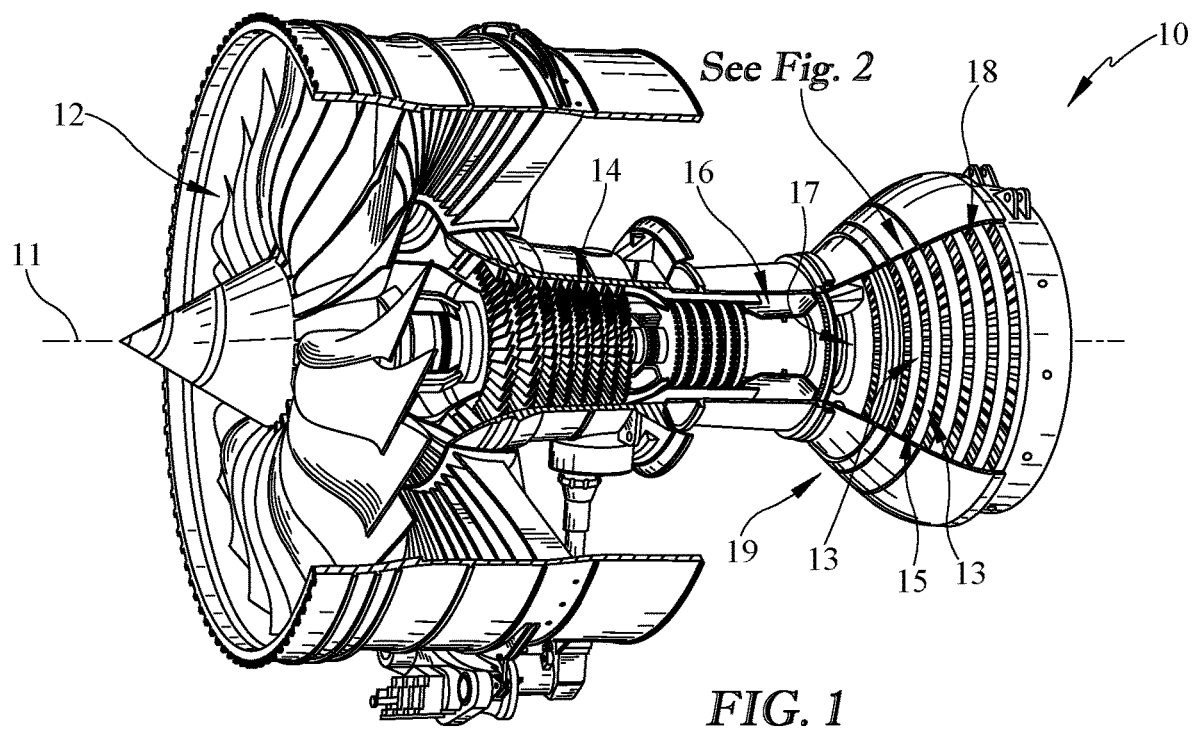
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

A turbine shroud segment 22 adapted for use with a gas turbine engine 10 is shown in FIGS. 2-7. The turbine shroud segment 22 includes a shroud segment 24, a carrier 26, and a retainer system 28. The shroud segment 24 defines a gas path 17 boundary of the gas turbine engine 10. The carrier 26 is configured to support the shroud segment 24 radially relative to an axis 11 of the gas turbine engine 10. The retainer system 28 has at least one bias member 30, illustratively two bias members 30, 32 located radially between the shroud segment 24 and the carrier 26 so as to apply a bias force FR to the shroud segment 24 to locate the shroud segment 24 and minimize the radial movement of the shroud segment 24 relative to the carrier 26.

The shroud segment 24 includes a shroud wall 44, a first attachment feature 46, and a second attachment feature 48 as shown in FIGS. 3-7. The shroud wall 44 extends circumferentially partway around the axis 11 to define the gas path 17 boundary. Each attachment feature 46, 48 extends radially outward away from the shroud wall 44. The second attachment feature 48 is spaced apart axially from the first attachment feature 46. In the illustrative embodiment, each of the bias members 30, 32 are axially aligned with one of the attachment features 46, 48.

The carrier 26 includes a carrier segment 54 and at least one axial pin 56, illustratively two pins 56, 58 as shown in FIGS. 4-7. The pins 56, 58 extend axially into the carrier segment 54 of the carrier 26 and the attachment features 46, 48 of the shroud segment 24 to couple the shroud segment 24 to the carrier segment 54.

During use of the turbine shroud segment 22 in the gas turbine engine 10, a low pressure differential may form across the shroud wall 44 of the shroud segment 24. The low pressure differential may allow chattering of the shroud segment 24 due to the blades 15 included in the engine 10 passing under the shroud segment 24. The passing frequency of the blades 15 may cause the shroud segment 24 to move relative to the carrier 26. Other times the blades 15 may push radially outward into the shroud segment 24 during a rub event and cause the shroud segment 24 to shift relative to the carrier 26.

The bias force FR applied to the shroud segment 24 by the bias members 30, 32 may overcome and/or dampen the forces applied by the blades 15 passing under the shroud segment 24. The bias force FR applied by the bias members 30, 32 minimizes the radial movement of the shroud segment 24 that would otherwise cause the shroud segment 24 to chatter.

The first bias member 30 is axially aligned with the first attachment feature 46 and the second bias member 32 is axially aligned with the second attachment feature 48 in the illustrative embodiment. Together the bias members 30, 32 apply the bias force FR to the shroud segment 24 in a radial direction to minimize the radial movement of the shroud segment 24 relative to the carrier 26.

Figure 4:
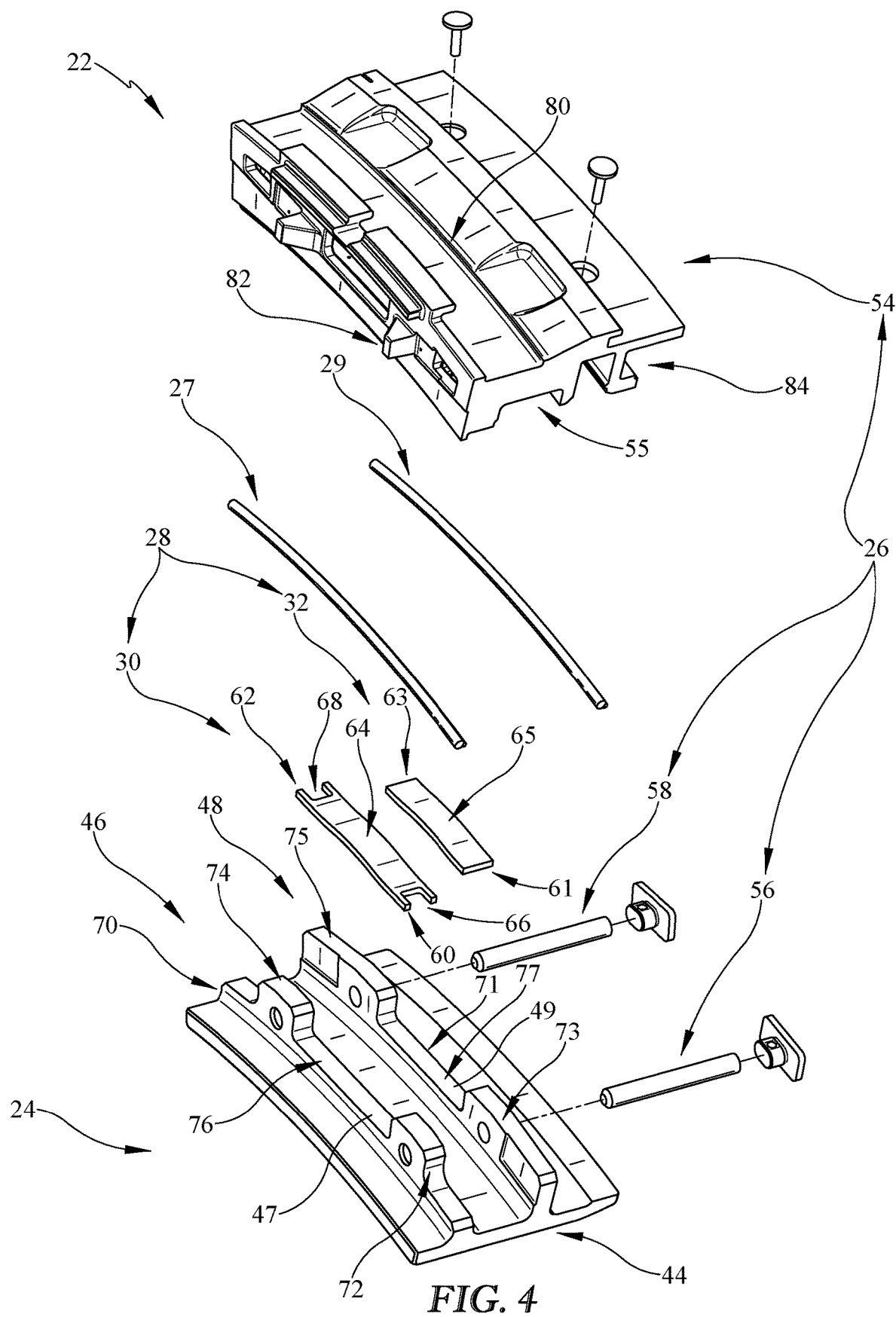
FIG. 4 is an exploded view of the turbine shroud assembly of FIG. 3 showing, from top to bottom, the carrier segment, the seals, the bias members, the axial pins, and the shroud segment.

Each bias member 30, 32 is a wave spring in the illustrative embodiment. The wave shape of the bias members 30, 32 defines a first end 60, 61, a second end 62, 63, and a body 64, 65 respectively as shown in FIGS. 4, 6, and 7. The first end 60, 61 is engaged with the shroud segment 24 at a first circumferential location. The second end 62, 63 is spaced apart circumferentially from the first end 60, 61 and engaged with the shroud segment 24 at a second circumferential location. The body 64, 65 extends between and interconnects the first end 60, 61 and the second end 62, 63. The body 64, 65 engages the carrier segment 54 at a third circumferential location positioned between the first and second circumferential locations.

In the illustrative embodiment, the first and second ends 60, 62 of the first bias member 30 engages a radially-outwardly facing surface 47 of the first attachment feature 46, while the body 64 engages a radially-inwardly facing surface 81 of the carrier segment 54. Similarly, the first and second ends 61, 63 of the second bias member 32 engages a radially-outwardly facing surface 49 of the second attachment feature 48, while the body 65 engages the radially-inwardly facing surface 81 of the carrier segment 54.

Each of the bias members 30, 32 urges the shroud segment 24 radially inward. The compression of the body 64, 65 at the third circumferential location causes the first and second ends 60, 61, 62, 63 into engagement with the radially-outwardly facing surfaces 47, 49 of the shroud segment 24. The first and second ends 60, 61, 62, 63 apply the bias force FR to the shroud segment 24 to overcome and dampen the forces applied by the blades 15 passing under the shroud segment 24.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about the axis 11 and drive the compressor 14 and the fan 12.

Figure 2:
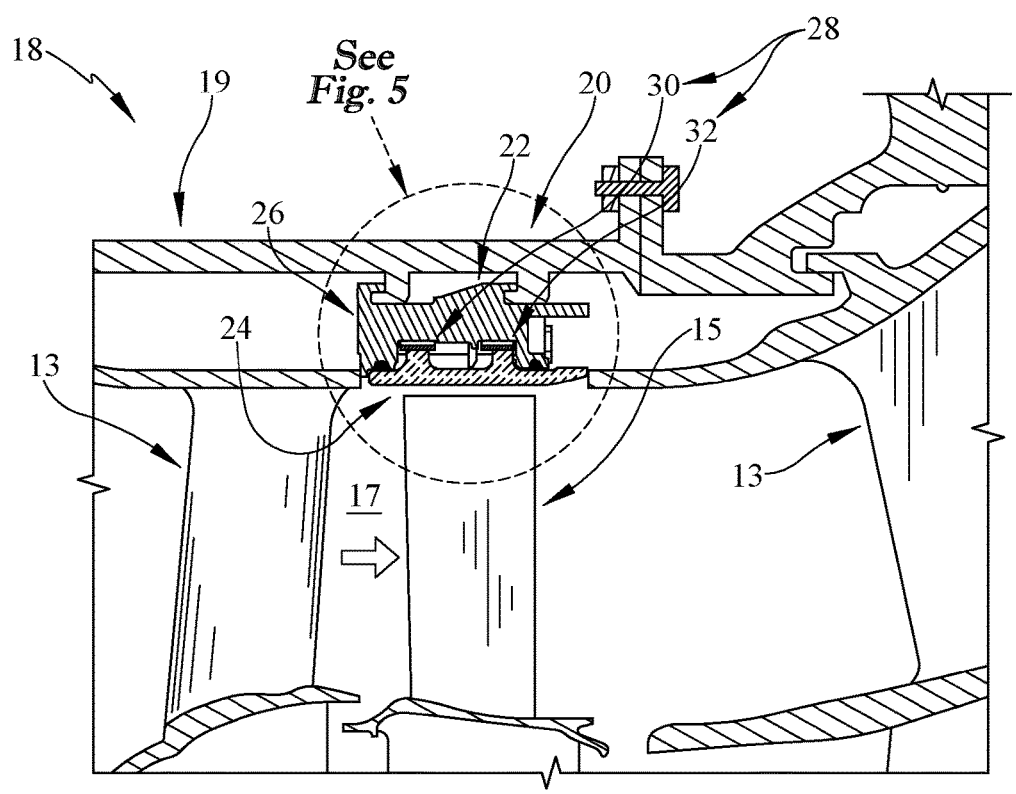
FIG. 2 is a section view of a portion of the gas turbine engine of FIG. 1 showing the turbine further includes a turbine shroud assembly positioned radially outward from blades of one of the rotating wheel assemblies, the turbine shroud assembly including a shroud segment that defines a portion of a gas path of the gas turbine engine, a carrier that includes a carrier segment and axial pins that support the shroud segment relative to the axis, and a retainer system having bias members located radially between the shroud segment and the carrier so as to apply a bias force to the shroud segment to minimize the radial movement of the shroud segment relative to the carrier.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17 boundary. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of turbine shroud segments 22, one of which is shown in FIGS. 3-7, that extend only partway around the central axis 11 and cooperate to surround the turbine wheel assembly 13. The turbine shroud segments 22 are sealed against one another, such as by strip seal members, to provide a continuous turbine shroud assembly 20.

Figure 5:
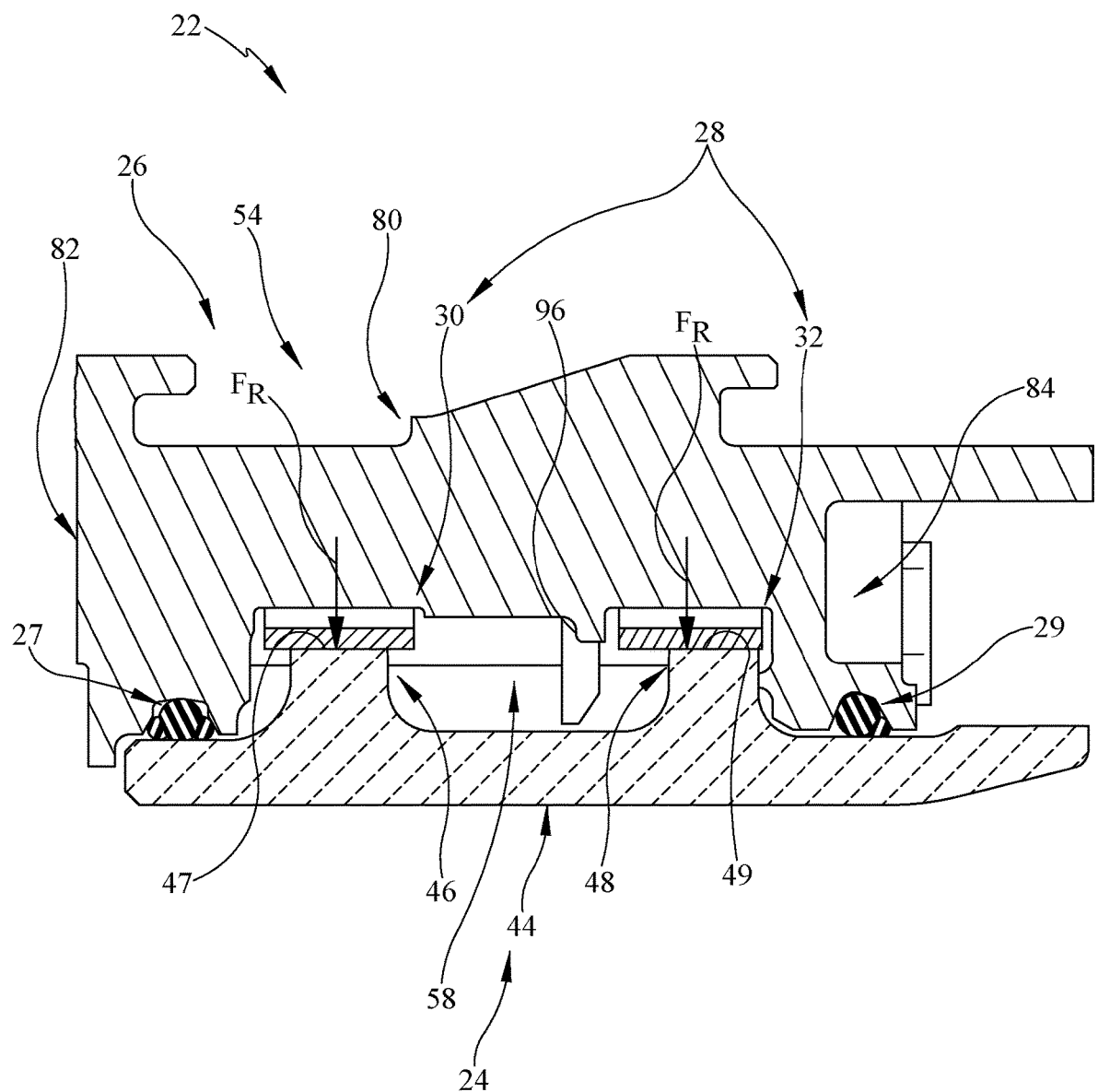
FIG. 5 is a detail cross-section view of the turbine shroud assembly of FIG. 2 showing a first bias member is axially aligned with a first attachment feature of the shroud segment and a second bias member spaced apart axially from the first bias member is axially aligned with a second attachment feature of the shroud segment to urge the shroud segment radially inward.

Each turbine shroud segment 22 includes the shroud segment 24, the carrier 26, the retainer system 28 having the bias members 30, 32, and seals 27, 29 as shown in FIGS. 2-7. The seals 27, 29 are located radially between the shroud wall 44 of the shroud segment 24 and the carrier segment 54 axially forward and aft of the attachment features 46, 48 as shown in FIG. 5. The seals 27, 29 are configured to seal off a cavity 55 of the carrier segment 54 that receives the attachment features 46, 48.

In the illustrative embodiment, the shroud segment 24 comprises ceramic matrix composite materials, while the carrier 26 comprises metallic materials. In other embodiments, the shroud segment 24, the carrier 26, and the retainer system 28 may each comprise any suitable materials including ceramics, ceramic matrix composites, metals, alloys, super alloys, etc.

The shroud segment 24 includes the shroud wall 44 and the attachment features 46, 48 as shown in FIGS. 3-7. Each attachment feature 46, 48 includes a base section 70, 71 a first mount post 72, 73, and a second mount post 74, 75 as shown in FIGS. 4, 6, and 7. The base section 70, 71 extends radially outward from the shroud wall 44. Both the first mount post 72, 73 and the second mount post 74, 75 extend radially outward form the base section 70, 71. The second mount post 74, 75 is spaced apart circumferentially from the first mount post 72, 73.

The first and second bias members 30, 32 are each located circumferentially between the first and second mount posts 72, 73, 74, 75 in the illustrative embodiment. The first bias member 30 is located between the first mount post 72 and the second mount post 74 of the first attachment feature 46. The second bias member 32 is located between the first mount post 73 and the second mount post 75 of the second attachment feature 48.

In the illustrative embodiment, the second mount post 74, 75 is spaced apart circumferentially from the first mount post 72, 73 to define a notch 76, 77 therebetween as shown in FIG. 4. The first bias member 30 is located in the notch 76 between the first and second mount posts 72, 74 of the first attachment feature 46 and engages the base section 70. The second bias member 32 is located in the notch 77 between the first and second mount posts 73, 75 of the second attachment feature 48 and engages the base section 71.

In the illustrative, the first bias member 30 includes features 66, 68 to axially locate the first bias member 30 relative to the first attachment feature 46. The first end 60 of the first bias member 30 is shaped to include a first groove 66, while the second end 62 is shaped to include a second groove 68 as shown in FIG. 4. The first groove 66 receives a portion of the first mount post 72 and the second groove 68 receives a portion of the second mount post 73 to block axial movement of the first bias member 30 relative to the shroud segment 24.

In some embodiments, the second bias member 32 includes similar features 66, 68. In other embodiments, the carrier 26 may include features to axially locate the bias members 30, 32 relative to the shroud segment 24.

Figure 3:
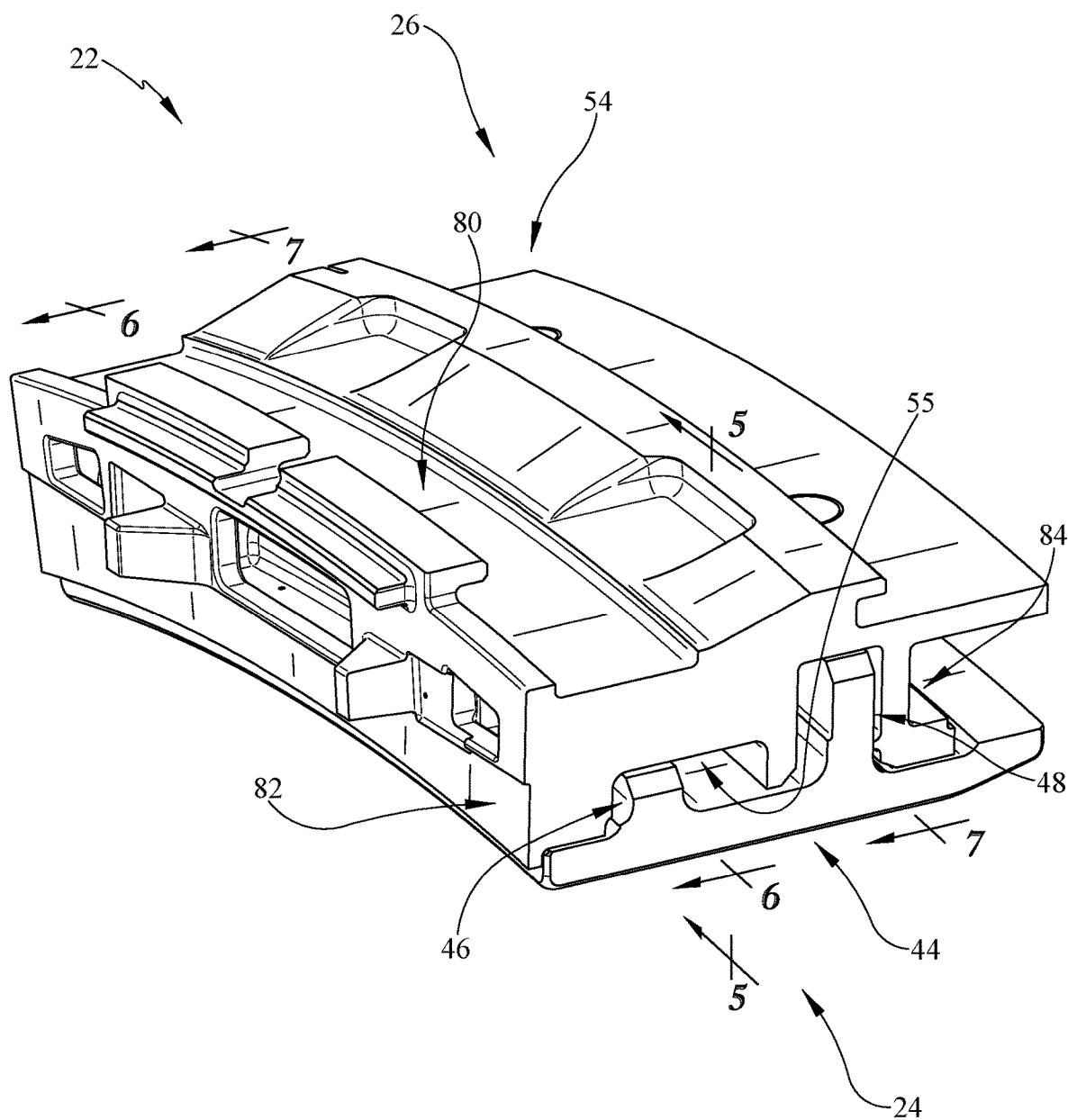
FIG. 3 is a perspective view of the turbine shroud assembly of FIG. 2 showing the carrier is segmented and extends only partway about an axis of the gas turbine engine.

The carrier segment 54 includes an outer wall 80, the first support arm 82, and the second support arm 84 as shown in FIGS. 3-5. The outer wall 80 extends circumferentially at least partway about the axis 11. The first or fore support arm 82 extends radially inward from the outer wall 80. The second or aft support arm 84 extends radially inward from the outer wall 80. The second support arm 84 is spaced apart axially aft from the fore support arm 82 to define the cavity 55 that receives the attachment features 46, 48 of the shroud segment 24.

One pin 56 extends axially into the first support arm 82 of the carrier segment 54, the first mount post 72 of the first attachment feature 46, and the first mount post 73 of the second attachment feature 48. The other pin 58 is spaced apart circumferentially from the first pin 56. The second pin 58 extends axially into the first support arm 82 of the carrier segment 54, the second mount post 74 of the first attachment feature 46, and the second mount post 75 of the second attachment feature 48. Each of the bias members 30, 32 are located circumferentially between the two pins 56, 58.

In the illustrative embodiment, the first and second bias members 30, 32 are located radially between the outer wall 80 of the carrier segment 54 and the base section 70, 71 of the corresponding attachment feature 46, 48 as shown in FIG. 5. The body 64, 65 of the bias member 30, 32 engages the outer wall 80 of the carrier segment 54, while the first and second ends 60, 61, 62, 63 engages the attachment feature 46, 48.

In the illustrative embodiment, the carrier segment 54 further includes an axial location feature 96 as shown in FIG. 5. The axial location feature 96 extends radially inward from the outer wall 80 axially forward of the second bias member 32. The second support arm 84 and the axial location feature 96 block axially movement of the second bias member 32 relative to the shroud segment 24.

In the illustrative embodiment, the first seal 27 is located radially between the first support arm 82 and the shroud wall 44 of the shroud segment 24. The second seal 29 is located radially between the second support arm 84 and the shroud wall 44 of the shroud segment 24.

A method for assembling the turbine shroud segment 22 may include several steps. Before assembling the shroud segment 24 on the carrier 26, the seal 27, 29 are located in channels (not shown) on the first and second support arms 82, 84. The first seal 27 is located in the channel on the first support arm 82. The second seal 29 is located in the channel on the second support arm 84.

With the seals 27, 29 in place, the shroud segment 24 is located adjacent to the carrier segment 54 so that the bias members 30, 32 are located radially between the radially-inwardly facing surface 81 of the carrier segment 54 and the radially-outwardly facing surfaces 47, 49 of the corresponding attachment feature 46, 48. The shroud segment 24 is located adjacent to the carrier segment 54 so that the first bias member 30 is located radially between the carrier segment 54 and the first attachment feature 46 and the second bias member 32 is located radially between the carrier segment 54 and the second attachment feature 48.

The bias members 30, 32 may be arranged on the corresponding attachment feature 46, 48 before the shroud segment 24 is arranged adjacent to the carrier segment 54. The attachment features 46, 48 are then inserted into the cavity 55 so that the pinholes in the attachment features 46, 48 align with the corresponding pinholes in the first and second support arms 82, 84 of the carrier segment 54.

The pins 56, 58 are then inserted axially into the carrier segment 54 and the attachment features 46, 48 of the shroud segment 24 to couple the shroud segment 24 with the carrier segment 54. The first pin 56 is inserted into the second support arm 84 of the carrier segment 54, the first mount post 72, 73 of the first and second attachment features 46, 48, and the first support arm 82 of the carrier segment 54. The second pin 58 is inserted into the second support arm 84 of the carrier segment 54, the second mount post 74, 75 of the first and second attachment features 46, 48, and the first support arm 82 of the carrier segment 54.

Once the pins 56, 58 are inserted and the shroud segment 24 is coupled to the carrier segment 54, the bias members 30, 32 apply the bias force FR to the attachment features 46, 48 of the shroud segment 24. Together the bias members 30, 32 apply the bias force FR to the shroud segment 24 in a radial direction to minimize the radial movement of the shroud segment 24 relative to the carrier 26.

Another embodiment of a turbine shroud segment 222 in accordance with the present disclosure is shown in FIG. 8-11. The turbine shroud segment 222 is substantially similar to the turbine shroud segment 22 shown in FIGS. 1-7 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a shroud segment 224, a carrier 226, seals 227, 229, and a retainer system 228 as shown in FIGS. 8-11. The shroud segment 224 includes a shroud wall 244 and attachment features 246, 248 that extend radially outward away from the shroud wall 244. The carrier 226 includes a carrier segment 254 and pins 256, 258 that extend axially into the carrier segment 254 of the carrier 226 and the attachment features 246, 248 of the shroud segment 224 to couple the shroud segment 224 to the carrier segment 254. The retainer system 228 comprises a plurality of bias members 230, 231, 232, 233 located radially between the shroud segment 224 and the carrier 226 so as to apply a bias force FR to the shroud segment 224 to minimize the radial movement of the shroud segment 224 relative to the carrier 226.

Each of the bias members 230, 231, 232, 233 are axially aligned with one of the attachment features 246, 248 and circumferentially aligned with one the pins 256, 258 included in the carrier 26 as shown in FIGS. 8-11. The first bias member 230 is axially aligned with the first attachment feature 246 and circumferentially aligned with the first pin 256. The second bias member 231 is axially aligned with the second attachment feature 248 and circumferentially aligned with the first pin 256. The third bias member 232 is axially aligned with the first attachment feature 246 and spaced apart circumferentially from the first bias member 230 so that the third bias member 232 is circumferentially aligned with the second pin 258. The fourth bias member 233 is axially aligned with the second attachment feature 248 and spaced apart circumferentially from the second bias member 231 so that the fourth bias member 233 is circumferentially aligned with the second pin 258.

The alignment of the bias members 230, 231, 232, 233 directly above each of pins 256, 258 applies the bias force FR to the shroud segment 224 at four different locations. Together the bias members 230, 231, 232, 233 apply the bias force FR to the shroud segment 224 in the radial direction to minimize the radial movement of the shroud segment 24 relative to the carrier 26.

In some embodiments, each of the bias member 230, 231, 232, 233 is a wave spring. In the illustrative embodiment, the bias members 230, 231, 232, 233 are rope seals. In other embodiments, the bias members 230, 231, 232, 233 may be a canted coil spring or another bias member suitable of applying a radial force.

Figure 9:
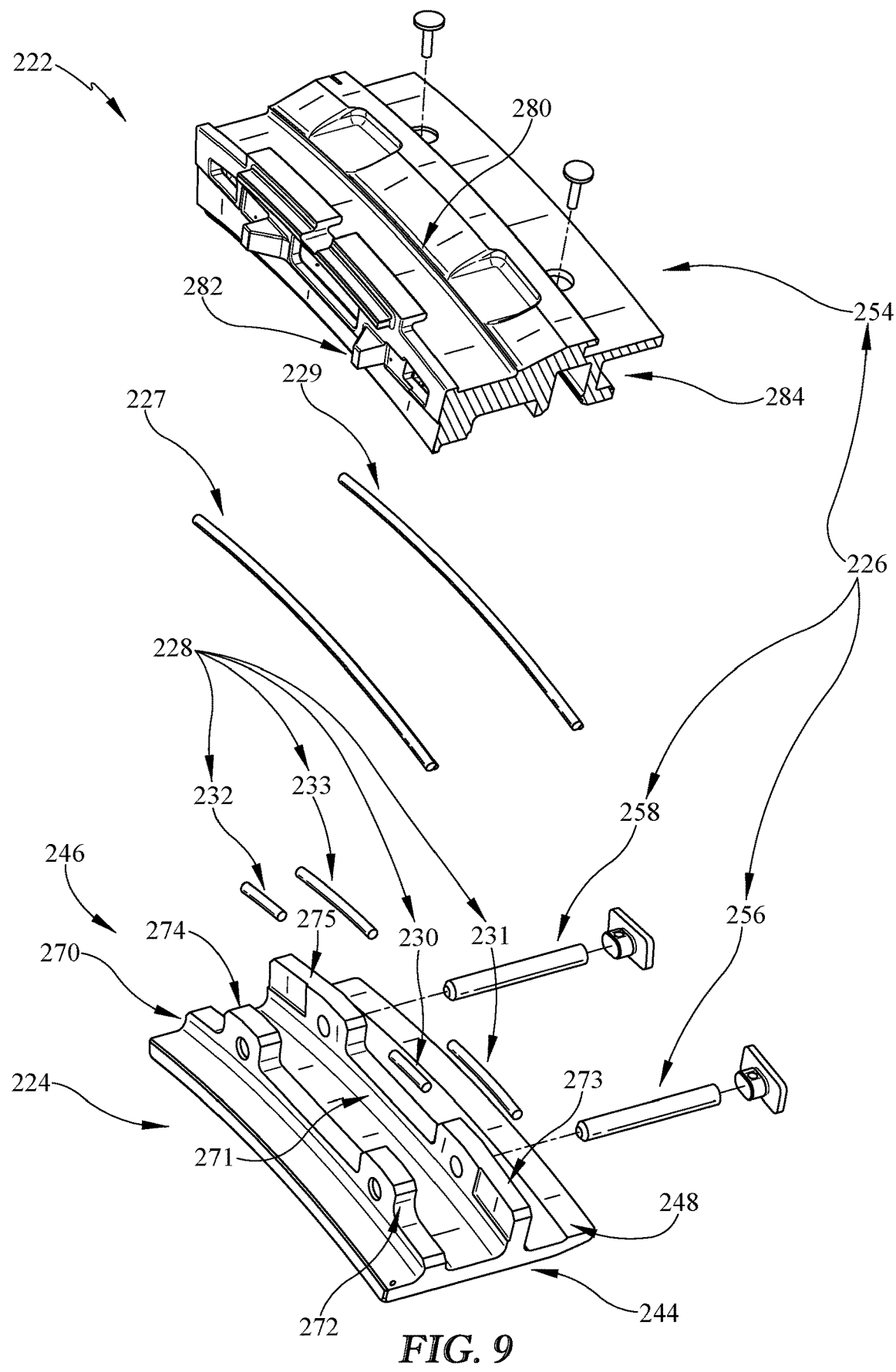
FIG. 9 is an exploded view of the turbine shroud assembly of FIG. 8 showing the retainer system includes four bias members for the four different mount posts of the attachment features included in the shroud segment.

In the illustrative embodiment, each attachment feature 246, 248 includes a base section 270, 271 a first mount post 272, 273, and a second mount post 274, 275 as shown in FIGS. 9-11. The base section 270, 271 extends radially outward from the shroud wall 244. Both the first mount post 272, 273 and the second mount post 274, 275 extend radially outward form the base section 270, 271. The second mount post 274, 275 is spaced apart circumferentially from the first mount post 272, 273.

The first bias member 230 is circumferentially aligned with the first mount post 272 of the first attachment feature 246, while the second bias third 232 is circumferentially aligned with the second mount post 274 of the first attachment feature 246. The second bias member 231 is circumferentially aligned with the first mount post 273 of the second attachment feature 248, while the fourth bias member 233 is circumferentially aligned with the second mount post 275 of the second attachment feature 248.

In the illustrative embodiment, the bias members 230, 231, 232, 233 extend the circumferential length of the corresponding mount post 272, 273, 274, 275. Some of the bias members 230, 231, 232, 233 have a circumferential length greater than the other bias members 230, 231, 232, 233. In other embodiments, the bias members 230, 231, 232, 233 extend part of the circumferential length of the corresponding mount post 272, 273, 274, 275.

In the illustrative, the carrier segment 254 includes an outer wall 280, the first support arm 282, and the second support arm 284 as shown in FIGS. 8-11. The outer wall 280 extends circumferentially at least partway about the axis 11. The first support arm 282 extends radially inward from the outer wall 280. The second support arm 284 is spaced apart axially from the first support arm 282 and extends radially inward from the outer wall 280.

Figure 8:
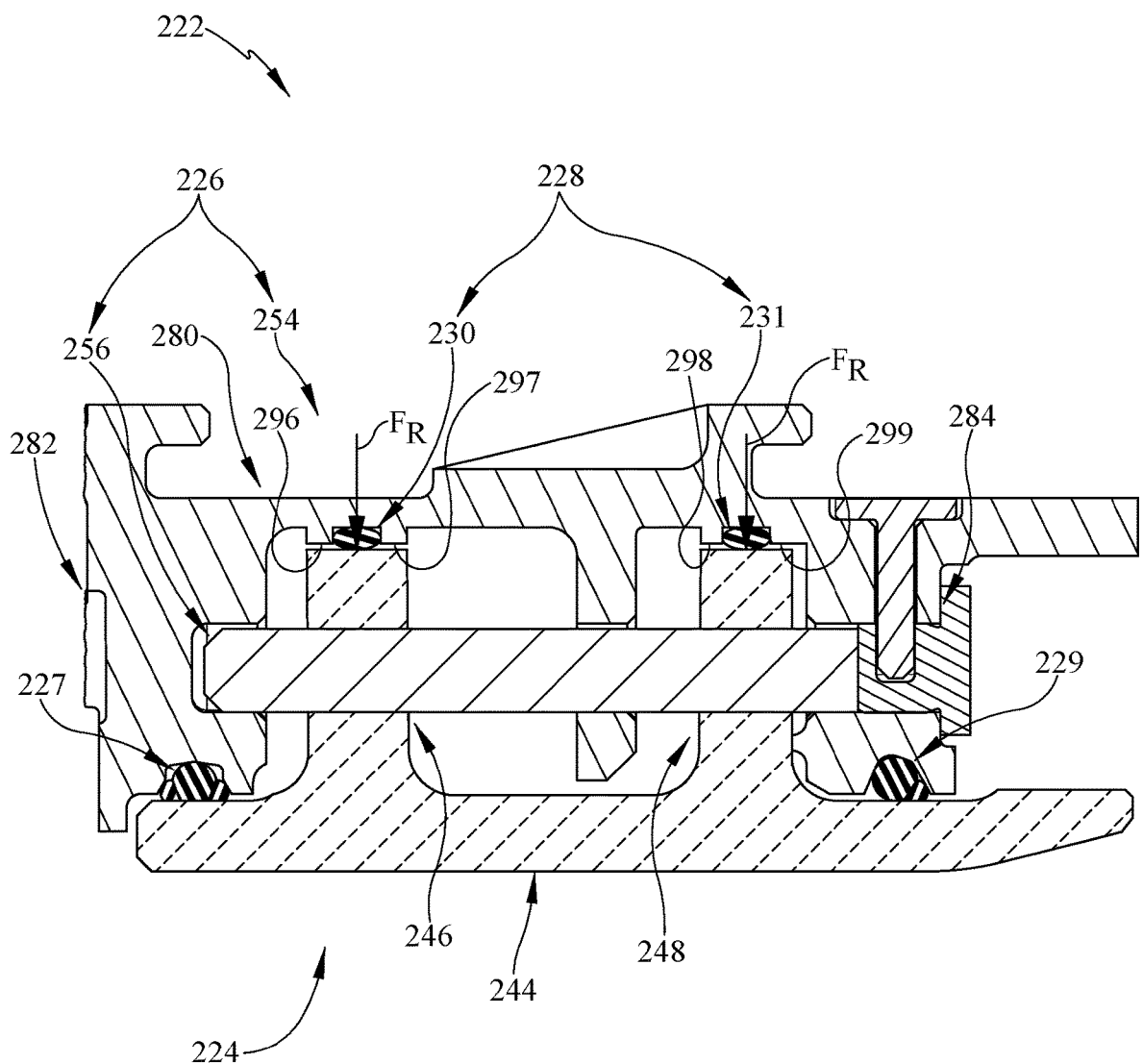
FIG. 8 is a cross-section view of another embodiment of a turbine shroud assembly adapted for use with the gas turbine engine of FIG. 1 showing the turbine shroud assembly includes a shroud segment, a carrier that supports the shroud segment relative to the axis, and retainer system, the retainer system including a plurality of radial bias members located radially between the carrier and attachment features of the shroud segment directly outward of axial pins included in the carrier so as to apply the bias force to the shroud segment radially outward of the pins.

In the illustrative embodiment, the carrier segment 254 further includes axial location features 296, 297, 298, 299 as shown in FIG. 8. The axial location features 296, 297, 298, 299 extend radially inward from the outer radial wall 280 axially forward and aft of each bias member 230, 231, 232, 233. The axial location features 296, 297, 298, 299 block axial movement of the bias members 230, 231, 232, 233 relative to the shroud segment 224.

The first axial location feature 296 extends radially inward from the outer wall 280 axially forward of the first and second bias members 230, 231. The second axial location feature 297 is spaced apart axially from the first axial location feature 296 and extends radially inward from the outer wall 280 axially aft of the first and second bias members 230, 231.

The third axial location feature 298 is spaced apart axially from the first and second axial location features 296, 297 and extends radially inward from the outer wall 280 axially forward of the third and fourth bias members 232, 233. The fourth axial location feature 299 is spaced apart axially form the third axial location feature 298 and extends radially inward from the outer wall 280 axially aft of the third and fourth bias members 232, 233.

A method for assembling the turbine shroud segment 222 may include several steps. The shroud segment 224 is located adjacent to the carrier segment 254 so that the bias members 230, 231, 232, 233 are located radially between the carrier segment 254 and the attachment features 246, 248. The bias members 230, 231, 232, 233 may be arranged on the corresponding attachment feature 246, 248 before the shroud segment 224 is arranged adjacent to the carrier segment 254.

In the illustrative embodiment, the first bias member 230 is arranged on the first mount post 272 of the first attachment feature 246, while the second bias member 231 is arranged on the second mount post 274 of the first attachment feature 246. The third bias member 232 is arranged on the first mount post 273 of the second attachment feature 248, while the fourth bias member 233 is arranged on the second mount post 275 of the second attachment feature 248.

The attachment features 246, 248 are then inserted into the cavity 255 so that the pinholes in the attachment features 246, 248 align with the corresponding pinholes in the first and second support arms 282, 284 of the carrier segment 254. The pins 256, 258 are then inserted axially into the carrier segment 254 and the attachment features 246, 248 of the shroud segment 224 to couple the shroud segment 224 with the carrier segment 254. Once the pins 256, 258 are inserted and the shroud segment 224 is coupled to the carrier segment 254, the bias members 230, 231, 232, 233 apply the bias force FR to the attachment features 246, 248 of the shroud segment 224.

Figure 12:
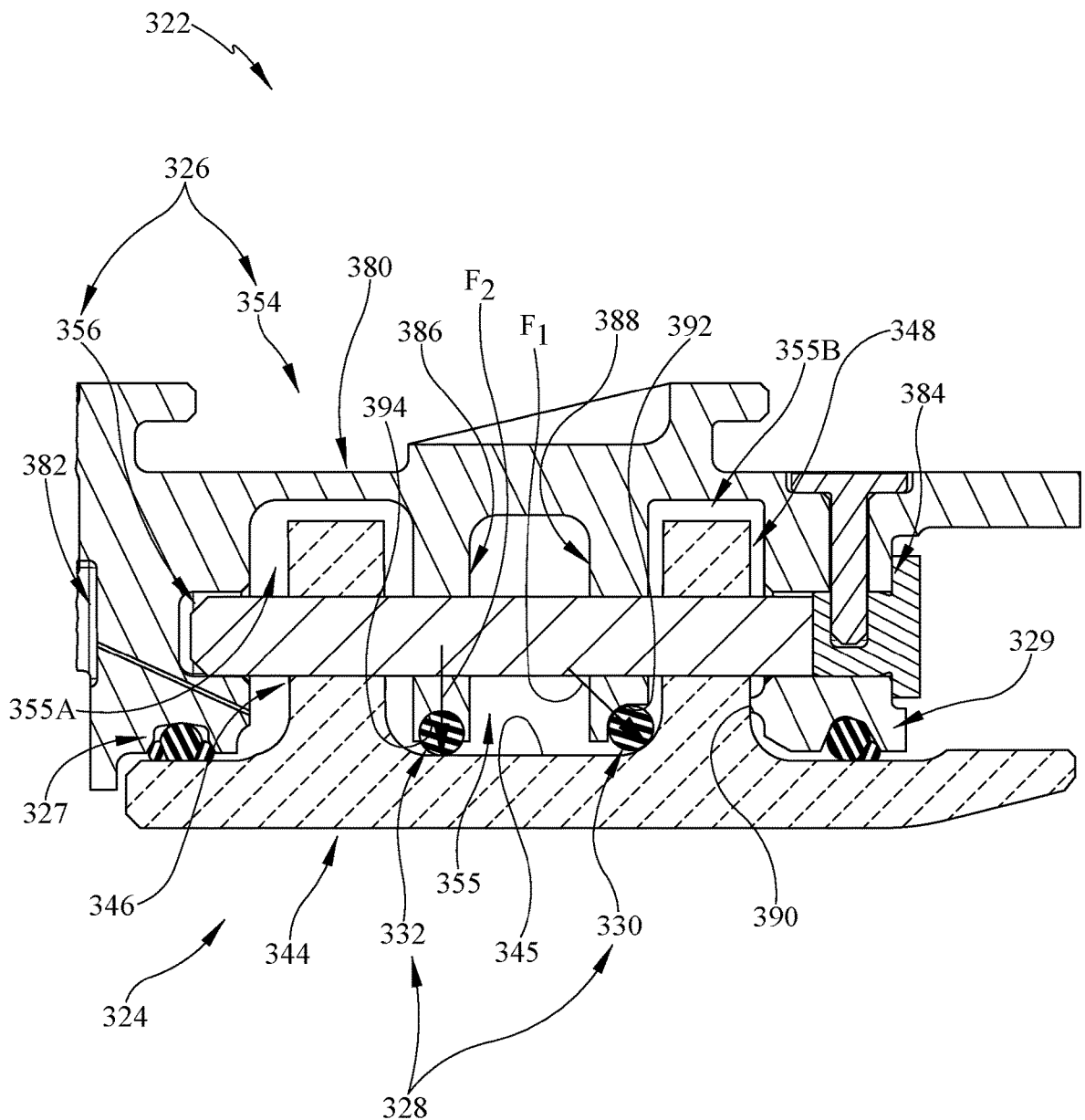
FIG. 12 is a cross-section view of another embodiment of a turbine shroud assembly included in the gas turbine engine of FIG. 1 showing the turbine shroud assembly includes a shroud segment, a carrier that supports the shroud segment relative to the axis, and retainer system configured to apply bias forces to the shroud segment, the retainer system including bias members located radially between a shroud wall of the shroud segment and the carrier segment so as to apply the bias force in both radial and axial directions.
Figure 13:
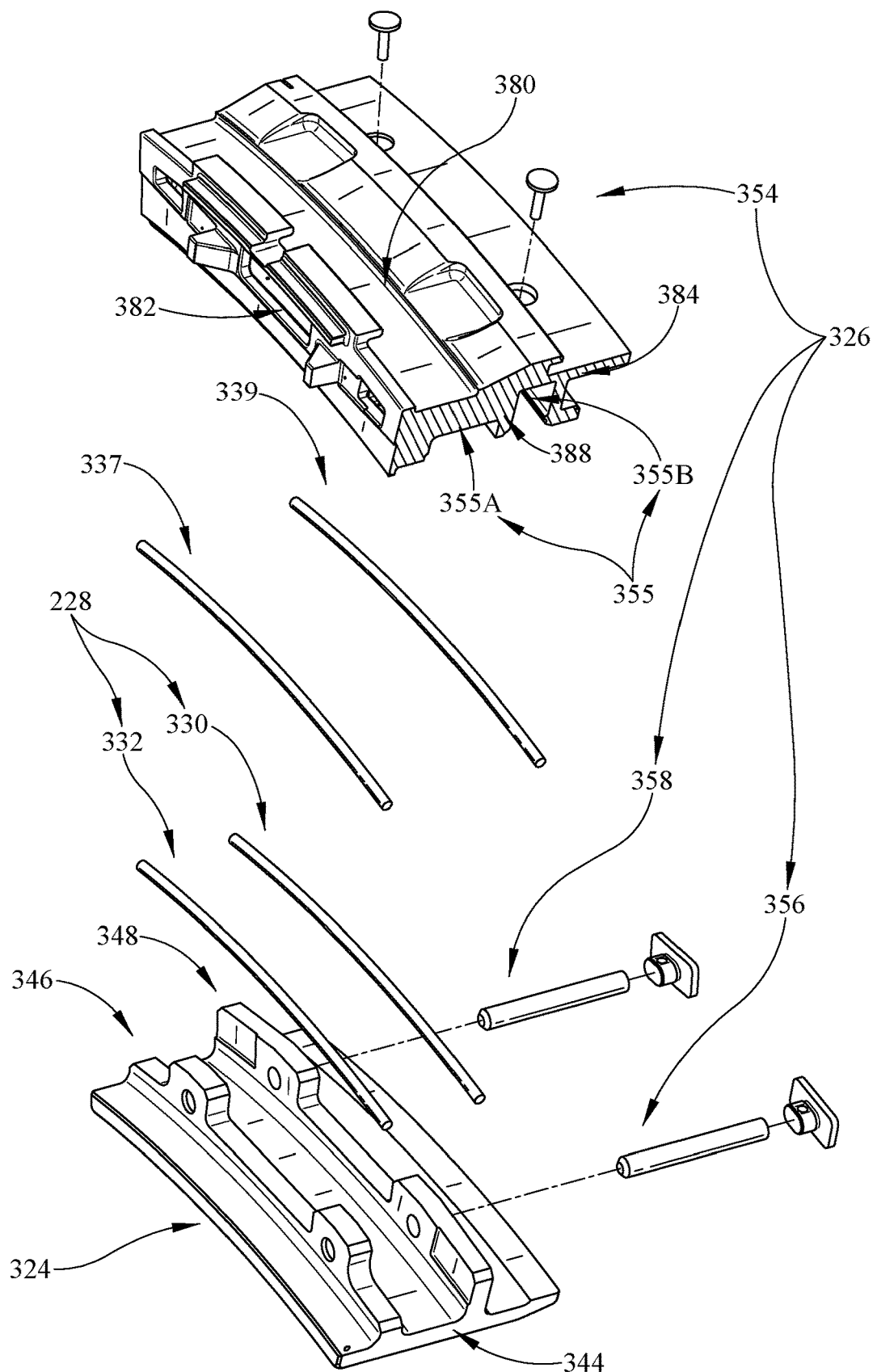
FIG. 13 is an exploded view of the turbine shroud assembly of FIG. 12 showing the bias members both extend circumferentially at least partway about the axis.

Another embodiment of a turbine shroud segment 322 in accordance with the present disclosure is shown in FIGS. 12 and 13. The turbine shroud segment 322 is substantially similar to the turbine shroud segment 32 shown in FIGS. 1-7 and described herein. Accordingly, similar reference numbers in the 300 series indicate features that are common between the turbine shroud segment 32 and the turbine shroud segment 322. The description of the turbine shroud segment 32 is incorporated by reference to apply to the turbine shroud segment 322, except in instances when it conflicts with the specific description and the drawings of the turbine shroud segment 322.

The turbine shroud segment 322 includes a shroud segment 324, a carrier 326, seals 327, 329, and a retainer system 328 as shown in FIGS. 12 and 13. The shroud segment 324 includes a shroud wall 344 and attachment features 346, 348 that extend radially outward away from the shroud wall 344. The carrier 326 includes a carrier segment 354 and pins 356, 358 that extend axially into the carrier segment 354 of the carrier 326 and the attachment features 346, 348 of the shroud segment 324 to couple the shroud segment 324 to the carrier segment 354. The retainer system 328 includes bias members 334, 336 configured to apply different bias forces $F_1$, $F_2$, one in the radial and axial direction, the other in only the radial direction.

The retainer system 328 has a first bias member 334 and a second bias member 336 as shown in FIGS. 12 and 13. The first and second bias members 334, 336 extends at least circumferentially partway about the axis 11. The first bias member 334 is configured to apply the first bias force $F_1$ in the radial and axial directions and a second bias member 336 configured to apply the second bias force $F_2$ in only the radial direction.

The first bias member 334 is located axially forward of the second attachment feature 348 and radially between the shroud wall 344 and the carrier segment 354. The first bias member 334 applies the first bias force $F_1$ to the shroud segment 324 in the radial direction to minimize radial movement of the shroud segment 324 relative to the carrier segment 354 and in the axial direction to axially locate the shroud segment 324 on an axial location feature 390 included on the carrier segment 354.

The second bias member 336 is located axially forward of the first bias member 334 and radially between the shroud wall 344 and the carrier segment 354. The second bias member 336 applies the second bias force $F_2$ to the shroud segment 324 in the radial direction to aid the first bias member 334 in minimizing the radial movement of the shroud segment 324 relative to the carrier segment 354.

The carrier segment 354 includes an outer wall 380, a plurality of support arms 382, 384, 386, 388, and the axial location feature 390 shown in FIGS. 12 and 13. The outer wall 380 extends circumferentially at least partway about the axis 11. The plurality of support arm 382, 384, 386, 388 are spaced apart axially from each other and each extend radially inward from the outer wall 380. Together, the outer wall 380 and the support arms 382, 384, 386, 388 form the body of the carrier segment 354.

The plurality of support arms 382, 384, 386, 388 includes a first support arm 382, a second support arm 384, a third support arm 386, and a fourth support arm 388 as shown in FIGS. 12 and 13. The second support arm 384 is spaced apart axially from the first support arm 382 to define a cavity 355. The third and fourth support arms 386, 388 extend radially inward from the outer wall 380 axially inbetween the first and second support arms 382, 384 to divide the cavity 355 into sections 355A, 355B.

The third support arm 386 is spaced axially aft of the first support arm 382 to define a first section 355A of the cavity 355. The first attachment feature 346 extends into the first section 355A of the carrier segment 354.

The fourth support arm 388 is spaced axially aft of the third support arm 386 and axially forward of the second support arm 384 to define a second section 355B of the cavity 355. The second attachment feature 348 extends into the second section 355B of the carrier segment 354.

The fourth support arm 388 includes an engagement surface 392 as shown in FIG. 12. The first bias member 334 is located between the engagement surface 392 of the fourth support arm 388 and the shroud wall 344. The engagement surface 392 is angled or curved and engages the first bias member 334 to cause the first bias member 334 to urge the shroud segment 324 radially and axially. In this way, the first bias force $F_1$ is in both the axial and radial directions.

In the illustrative embodiment, the fourth support arm 388 includes the axial location feature 390 as shown in FIG. 12. The first bias force $F_1$ applied by the first bias member 334 is configured to bias the second attachment feature 348 into engagement with the axial location feature 390, or chordal seal. The engagement of the second attachment feature 348 with the axial location feature 390 helps seal the cavity 355.

The second bias member 336 is located between the third support arm 386 and the shroud wall 344. The third support arm 386 may include a curved surface 394 that holds the second bias member 336 in place. The curved surface 394 engages the second bias member 336 to cause the second bias member 336 to urge the shroud segment 324 radially such that the second bias force $F_1$ is in only the radial direction.

In the illustrative embodiment, the seals 327, 329 are located radially between the shroud wall 344 and first and second support arms 382, 384 of the carrier segment 354 axially forward and aft of the attachment features 346, 348. The bias members 334, 336 are located axially in between the attachment features 346, 348.

A method for assembling the turbine shroud segment 322 may include several steps. To begin assembling the turbine shroud segment 322, the first bias member 334 is located on a first radially-outwardly facing surface 345 of the shroud segment 324. The second bias member 336 is located on the first radially-outwardly facing surface 345 of the shroud segment 324.

With the bias members 334, 336 in place, the shroud segment 324 is located adjacent to the carrier segment 354. To locate the shroud segment 324 adjacent to the carrier segment 354, the attachment features 346, 348 are inserted into the respective cavity sections 355A, 355B.

The arrangement of the shroud segment 324 adjacent to the carrier segment 354 locates the bias members 334, 336 radially between the carrier segment 354 and the first radially-outwardly facing surface 345 of the shroud segment 324. The first bias member 334 is located radially between the engagement surface 392 of the fourth support arm 388 and the second bias member 336 is located radially between the curved surface 394 of the third support arm 386.

Next, the pins 356, 358 are inserted into the carrier segment 354 and the shroud segment 324 to couple the shroud segment 324 with the carrier segment 354. The first pin 356 is inserted into the carrier segment 354 so that the first pin 356 extends axially into the first support arm 382, the first attachment feature 346, the third and fourth support arms 386, 388, the second attachment feature 348, and the second support arm 384.

The second pin 358 is inserted at a location spaced apart circumferentially from the first pin 356. The second pin 358 is inserted into the carrier segment 354 so that the second pin 358 extends axially into the first support arm 382, the first attachment feature 346, the third and fourth support arms 386, 388, the second attachment feature 348, and the second support arm 384.

With the shroud segment 324 coupled to the carrier segment 354, the first bias member 334 applies the first bias force $F_1$ to the shroud segment 324 to minimize radial movement of the shroud segment 324 relative to the carrier 326 and to axially locate the shroud segment 324 on the axial location feature 390 formed on the carrier segment 354. The second bias member 336 applies the second bias force $F_2$ to the shroud segment 324 to aid the first bias member 334 in minimizing the radial movement of the shroud segment 324 relative to the carrier 326.

Figure 14:
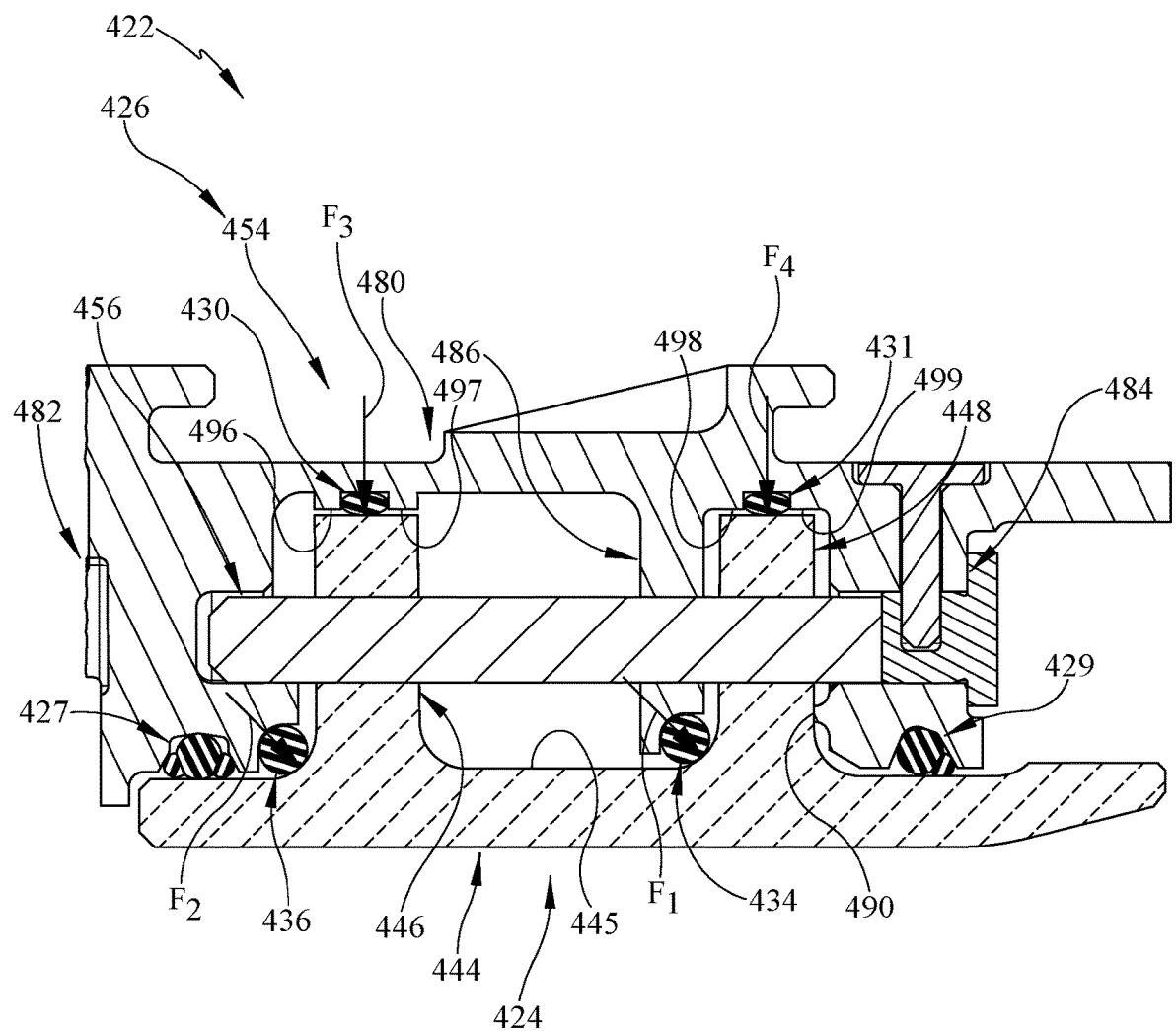
FIG. 14 is a cross-section view of another embodiment of a turbine shroud assembly adapted for use with the gas turbine engine of FIG. 1 showing the turbine shroud assembly includes a shroud segment, a carrier that supports the shroud segment relative to the axis, and retainer system configured to apply bias forces to the shroud segment, the retainer system including bias members located radially between a shroud wall of the shroud segment and the carrier segment and between attachment features of the shroud segment and the carrier segment.

Another embodiment of a turbine shroud segment 422 in accordance with the present disclosure is shown in FIGS. 13 and 14. The turbine shroud segment 422 is substantially similar to the turbine shroud segments 22, 422 shown in FIGS. 1-7, 12, and 13 and described herein. Accordingly, similar reference numbers in the 400 series indicate features that are common between the turbine shroud segments 22, 322 and the turbine shroud segment 422. The description of the turbine shroud segments 22, 322 is incorporated by reference to apply to the turbine shroud segment 422, except in instances when it conflicts with the specific description and the drawings of the turbine shroud segment 422.

The turbine shroud segment 422 includes a shroud segment 424, a carrier 426, and a retainer system 428 as shown in FIGS. 13 and 14. The shroud segment 424 includes a shroud wall 444 and attachment features 446, 448 that extend radially outward away from the shroud wall 444. The carrier 426 includes a carrier segment 454 and pins 456, 458 that extend axially into the carrier segment 454 of the carrier 426 and the attachment features 446, 448 of the shroud segment 424 to couple the shroud segment 424 to the carrier segment 454. The retainer system 428 includes bias members 430, 431, 432, 433, 434, 436 that each extends at least circumferentially partway about the axis 11 and are configured to apply different bias forces $F_1$, $F_2$, $F_3$, $F_4$, some in the radial and axial direction, the others in only the radial direction.

The retainer system 428 has two bias members 434, 436 that are each configured to apply a bias force $F_1$, $F_2$ in the radial and axial directions. The other remaining bias members 430, 431, 432, 433 are each configured to apply a bias force $F_3$, $F_4$ in only the radial direction.

The first bias member 434 is located axially forward of the aft attachment feature 448 and radially between the shroud wall 444 and the carrier segment 454. The second bias member 436 is located axially forward of the forward attachment feature 446 and radially between the shroud wall 444 and the carrier segment 454. Together the bias members 434, 436 apply the first and second bias forces $F_1$, $F_2$ to the shroud segment 424 in the radial direction to minimize radial movement of the shroud segment 424 relative to the carrier segment 454 and in the axial direction to axially locate the shroud segment 424 on an axial location feature 490 included on the carrier segment 454.

The other bias members 430, 431, 432, 433 included in the retainer system 428 are located radially between the attachment features 446, 448 of the shroud segment 424 and the carrier segment 454. The bias members 430, 431, 432, 433 apply bias forces $F_3$, $F_4$ in only the radial direction to aid in minimizing the radial movement of the shroud segment 424.

The third bias member 430 is located radially between the first attachment feature 446 of the shroud segment 424 and the carrier segment 454 so as to apply a third bias force $F_3$ to the shroud segment 424. The fourth bias member 431 is located radially between the second attachment feature 448 of the shroud segment 424 and the carrier segment 454 so as to apply a fourth bias force $F_4$ to the shroud segment 424.

Figure 15:
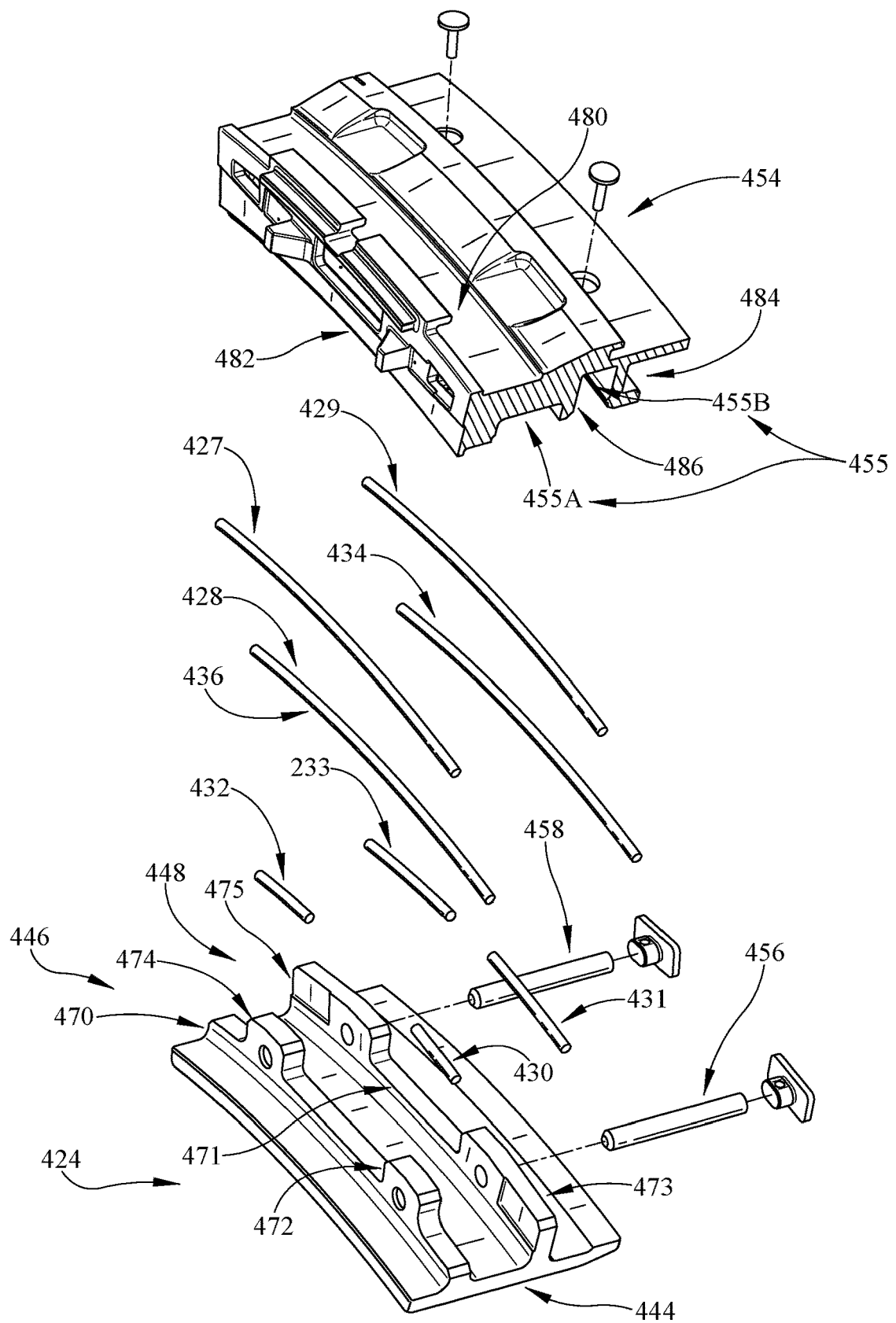
FIG. 15 is an exploded view of the turbine shroud assembly of FIG. 14 showing the bias members all extend circumferentially at least partway about the axis and each have varying lengths.

In the illustrative embodiment, each attachment feature 446, 448 includes a base section 470, 471 a first mount post 472, 473, and a second mount post 474, 475 as shown in FIG. 15. The base section 470, 471 extends radially outward from the shroud wall 444. Both the first mount post 472, 473 and the second mount post 74, 75 extend radially outward form the base section 470, 471. The second mount post 474, 475 is spaced apart circumferentially from the first mount post 472, 473.

The third bias member 430 is circumferentially aligned with the first mount post 472 of the first attachment feature 446, while a fifth bias member 432 is circumferentially aligned with the second mount post 474 of the first attachment feature 446. The fourth bias member 431 is circumferentially aligned with the first mount post 473 of the second attachment feature 448, while a sixth bias member 433 is circumferentially aligned with the second mount post 475 of the second attachment feature 448.

In the illustrative embodiment, the carrier segment 454 includes an outer wall 480 and a plurality of support arms 482, 484, 486, an axial location feature 490 as shown in FIGS. 14 and 15. The outer wall 480 extends circumferentially at least partway about the axis 11. The plurality of support arm 482, 484, 486 are spaced apart axially from each other and each extend radially inward from the outer wall 480. Together, the outer wall 480 and the support arms 482, 484, 486 form the body of the carrier segment 454. The axial location feature 490 extends axially forward from one of the support arms 484 to help axially locate the shroud segment 424.

The plurality of support arms 482, 484, 486 includes a first support arm 482, a second support arm 484, and a third support arm 486 as shown in FIGS. 14 and 15. The second support arm 484 is spaced apart axially from the first support arm 482 to define a cavity 455. The third support arm 486 extends radially inward from the outer wall 480 axially in between the first and second support arms 482, 484 to divide the cavity 455 into sections 455A, 455B.

The first attachment feature 446 extends into the first section 455A of the carrier segment 454. The second attachment feature 448 extends into the second section 455B of the carrier segment 454. The axial location feature 490 extends axially forward from the second support arm 484 and engages the second attachment feature 448 in the illustrative embodiment.

The third support arm 486 includes an engagement surface 492 as shown in FIG. 14. The first bias member 434 is located between the engagement surface 492 of the third support arm 486 and the shroud wall 444. The engagement surface 492 is angled or curved and engages the first bias member 434 to cause the first bias member 434 to urge the shroud segment 424 radially and axially. In this way, the first bias force $F_1$ is in both the axial and radial directions.

The first support arm 482 includes an engagement surface 494 as shown in FIG. 14. The second bias member 436 is located between the engagement surface 494 of the first support arm 482 and the shroud wall 444. The engagement surface 492 is angled or curved like the engagement surface of the third support arm 486. The engagement surface 492 engages the second bias member 436 to cause the second bias member 436 to urge the shroud segment 424 radially and axially. In this way, the second bias force $F_2$ is in both the axial and radial directions.

The axial location features 496, 497, 498, 499 extends radially inward from the outer wall 480 around the corresponding bias members 430, 431, 432, 433 as shown in FIG. 14. The axial location features 496, 497, 498, 499 extend radially inward from the outer wall 480 axially forward and aft of each bias member 430, 431, 432, 433 to block axially movement of the bias members 430, 431, 432, 433 relative to the shroud segment 424.

The first axial location feature 496 extends radially inward from the outer wall 480 axially forward of the third and fifth bias members 430, 431. The second axial location feature 497 is spaced apart axially from the first axial location feature 496 and extends radially inward from the outer wall 480 axially aft of the third and fifth bias members 430, 431.

The third axial location feature 498 is spaced apart axially from the first and second axial location features 496, 497 and extends radially inward from the outer wall 480 axially forward of the fourth and fifth bias members 432, 433. The fourth axial location feature 499 is spaced apart axially form the third axial location feature 498 and extends radially inward from the outer wall 480 axially aft of the fourth and fifth bias members 432, 433.

In the illustrative embodiment, the turbine shroud segment 422 further includes seals 427, 429 as shown in FIG. 14. The seals 427, 429 are located radially between the shroud wall 444 and first and second support arms 482, 484 of the carrier segment 454 axially forward and aft of the attachment features 446, 448. The bias members 434, 436 are located axially in between the seals 427, 429.

A method for assembling the turbine shroud segment 422 may include several steps. To begin assembling the turbine shroud segment 422, the first bias member 434 is located on a radially-outwardly facing surface 445 of the shroud segment 424. The second bias member 436 is located on the radially-outwardly facing surface 445 of the shroud segment 424. The remaining bias members 430, 431, 432, 433 may be located axially in between the axial location features 496, 497, 498, 499 on the carrier segment 354 or the bias members 430, 431, 432, 433 may be located on the radially-outwardly facing surface of the first and second mount posts 472, 473, 474, 475.

With the bias members 430, 431, 432, 433, 434, 436 in place, the shroud segment 424 is located adjacent to the carrier segment 454. To locate the shroud segment 424 adjacent to the carrier segment 454, the attachment features 446, 448 are inserted into the respective cavity sections 455A, 455B.

The arrangement of the shroud segment 424 adjacent to the carrier segment 454 locates the bias members 434, 436 radially between the carrier segment 454 and the shroud segment 424. The first bias member 434 is located radially between the engagement surface 492 of the third support arm 486 and the carrier segment 454. The second bias member 436 is located radially between the engagement surface 494 of the first support arm 486 and the carrier segment. The other bias members are located radially between the outer wall 480 of the carrier segment 454 and the corresponding mount post 472, 473, 474, 475 of the attachment features 446, 448.

Next, the pins 456, 458 are inserted into the carrier segment 454 and the shroud segment 424 to couple the shroud segment 424 with the carrier segment 454. The first pin 456 is inserted into the carrier segment 454 so that the first pin 456 extends axially into the first support arm 482, the first attachment feature 446, the third support arm 486, the second attachment feature 448, and the second support arm 484.

The second pin 458 is inserted at a location spaced apart circumferentially from the first pin 456. The second pin 458 is inserted into the carrier segment 454 so that the second pin 458 extends axially into the first support arm 482, the first attachment feature 446, the third support arm 486, the second attachment feature 448, and the second support arm 484.

With the shroud segment 424 coupled to the carrier segment 454, the first and second bias members 434, 436 apply the first and second bias forces $F_1$, $F_2$ to the shroud segment 424 to minimize radial movement of the shroud segment 424 relative to the carrier 426 and to axially locate the shroud segment 424 on the axial location feature 490 formed on the carrier segment 454. The third, fourth, fifth, and sixth bias members apply the third and fourth bias forces $F_3$, $F_4$ to the shroud segment 424 to aid the first and second bias members 434, 436 in minimizing the radial movement of the shroud segment 424 relative to the carrier 426.

Figure 16:
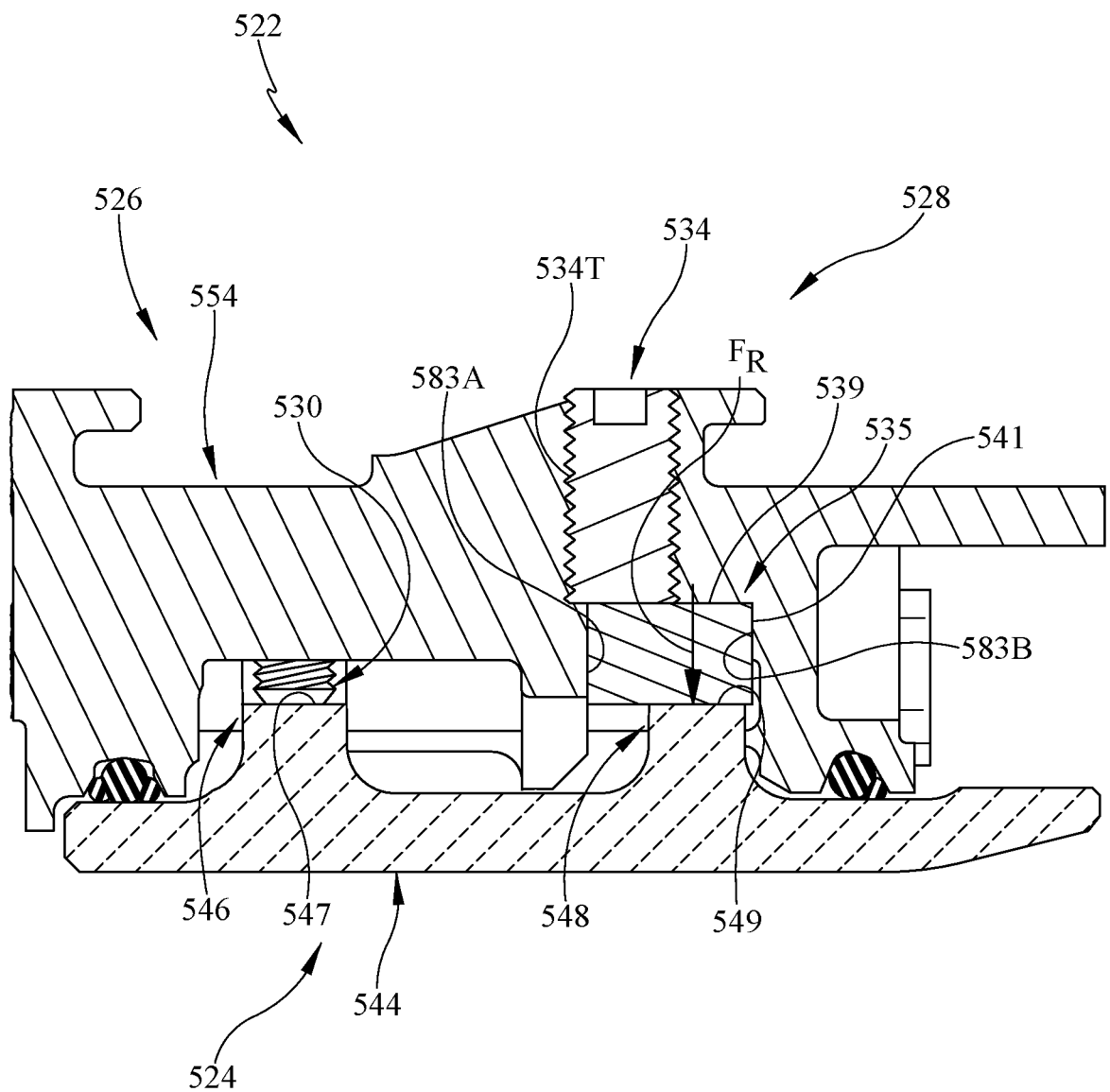
FIG. 16 is a cross-section view of another embodiment of a turbine shroud assembly adapted for use with the gas turbine engine of FIG. 1 showing the turbine shroud assembly includes a shroud segment, a carrier that supports the shroud segment relative to the axis, and retainer system configured to apply bias forces to the shroud segment, the retainer system including setscrews that apply a radial inward force to attachment features included in the shroud segment to urge the shroud segment radially away from the carrier segment.
Figure 17:
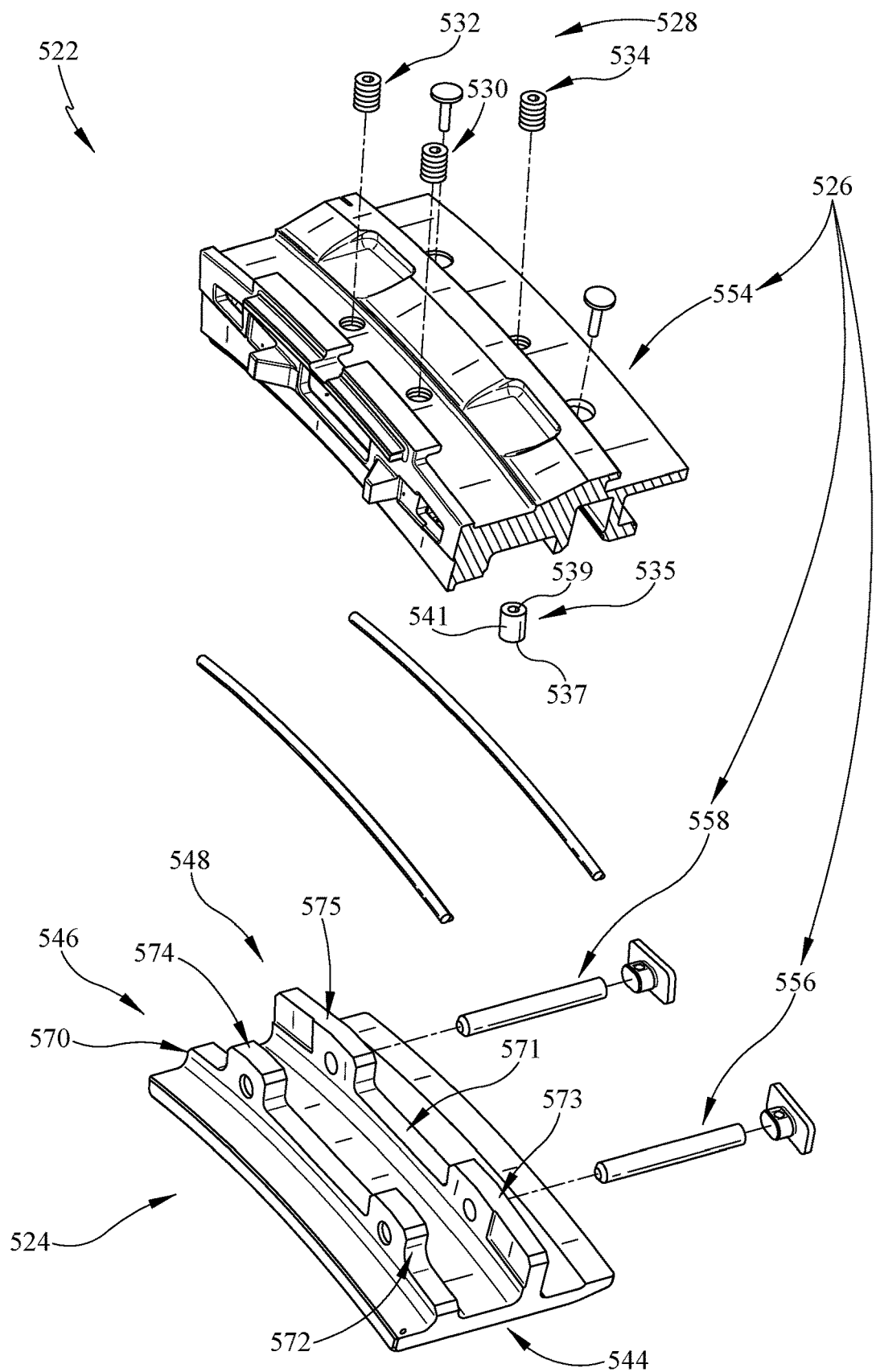
FIG. 17 is an exploded view of the turbine shroud assembly of FIG. 14 showing the retainer system further includes a plug that is configured to be located between one of the third setscrews and one of the attachment features of the shroud segment.
Figure 18:
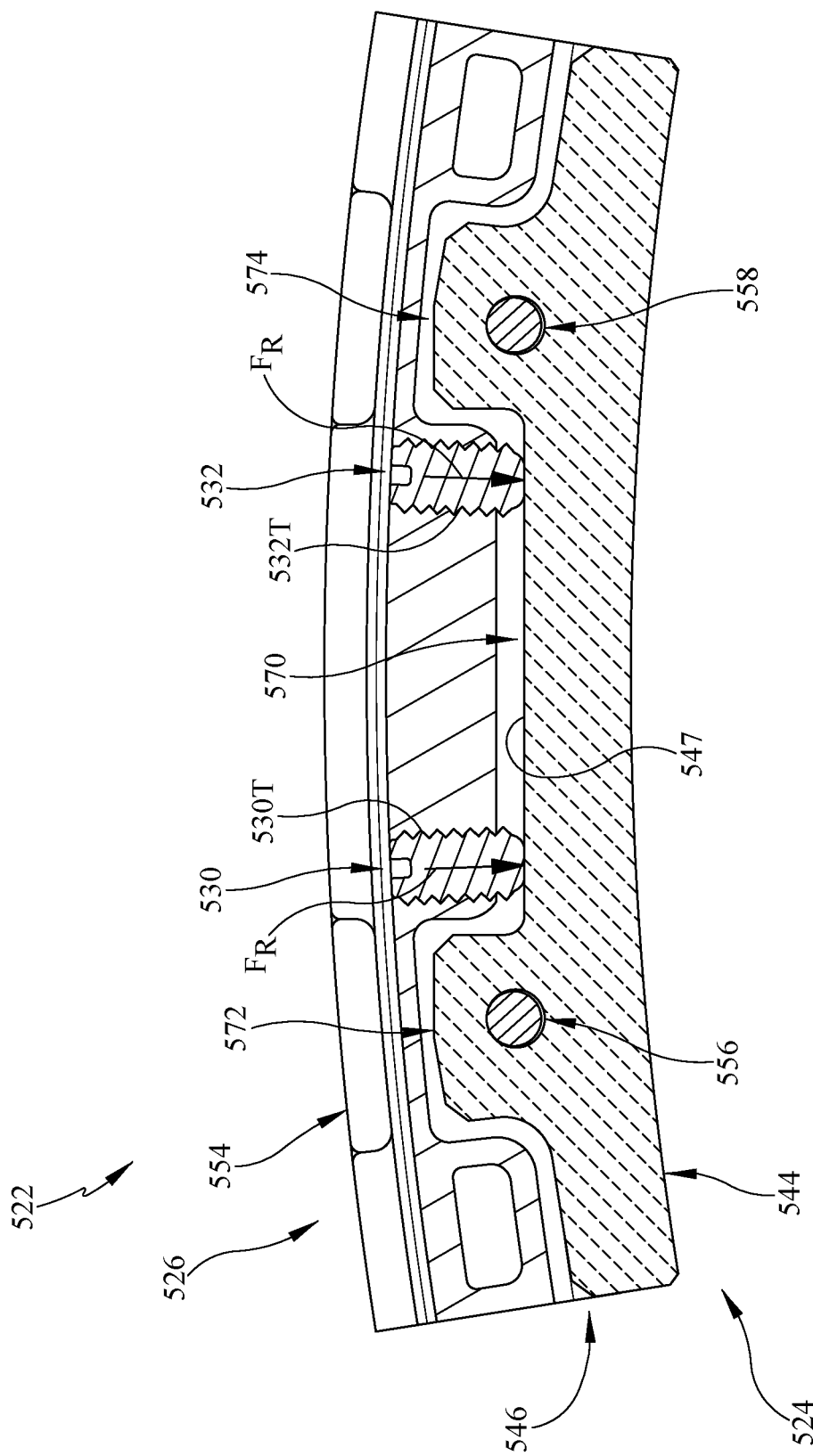
FIG. 18 is a cross-section view of the turbine shroud assembly of FIG. 16 showing the setscrews for the first attachment feature of the shroud segment are spaced apart circumferentially from each other.

Another embodiment of a turbine shroud segment 522 in accordance with the present disclosure is shown in FIG. 16-18. The turbine shroud segment 522 is substantially similar to the turbine shroud segment 22 shown in FIGS. 1-7 and described herein. Accordingly, similar reference numbers in the 500 series indicate features that are common between the turbine shroud segments 22 and the turbine shroud segment 522. The description of the turbine shroud segments 22 is incorporated by reference to apply to the turbine shroud segment 522, except in instances when it conflicts with the specific description and the drawings of the turbine shroud segment 522.

The turbine shroud segment 522 includes a shroud segment 524, a carrier 526, and a retainer system 528 as shown in FIGS. 16-18. The shroud segment 524 includes a shroud wall 544 and attachment features 546, 548 that extend radially outward away from the shroud wall 544. The carrier 526 includes a carrier segment 554 and pins 556, 558 that extend axially into the carrier segment 554 of the carrier 526 and the attachment features 546, 548 of the shroud segment 524 to couple the shroud segment 524 to the carrier segment 554. The retainer system 528 includes setscrews 530, 532, 534 threadedly coupled to the carrier segment 554. Each setscrew 530, 532, 534 applies a radial inward force $F_1$, $F_2$, $F_3$ to the attachment features 546, 548 of the shroud segment 524 to urge the shroud segment 524 radially away from the carrier segment 554 and minimize radial movement of the shroud segment 524 relative to the carrier 526.

The first and second setscrews 530, 532 engage the first attachment feature 546, while the third setscrew 534 engages the second attachment feature 548. The second setscrew 532 is spaced apart circumferentially from the first setscrew 530. The third setscrew 534 is located circumferentially between the first and second setscrews 530, 532 when the turbine shroud segment 522 is viewed in the axial direction.

Each of the setscrews 530, 532, 534 have threads 530T, 532T, 534T and are adjustable relative to the carrier segment 554. The setscrews 530, 532, 534 may be individually tightened or loosened to adjust the engagement with the shroud segment 524, and thus adjusting the radial inward force $F_1$, $F_2$, $F_3$ applied to the shroud segment 524.

In the illustrative embodiment, the retainer system 528 includes three setscrews 530, 532, 534 with two setscrews 530, 532 engaged with the first attachment feature 546 and other remaining setscrew 534 engaged with the second attachment feature 548. In other embodiments, two of the setscrews 530, 532, 534 may be engaged with the second attachment feature 548 and other remaining setscrew 530, 532, 534 engaged with the first attachment feature 546.

In some embodiments, the retainer system 528 may include more or less than three setscrews. In other embodiments, the retainer system 528 may include only two setscrews 530, 523, 534, one setscrew 530, 532, 534 engaged with the first attachment feature 546 and the other setscrew 530, 532, 534 engaged with the second attachment feature 548.

In the illustrative embodiment, the retainer system 528 further includes a plug 535 as shown in FIGS. 15 and 16. The plug 535 is located radially between the third setscrew 534 and the second attachment feature 548 of the shroud segment 524.

In the illustrative embodiment, the plug 535 comprises metallic materials. In other embodiments, the plug 535 may be a compliant material or a spring.

The plug 535 includes a radially-inwardly facing surface 537, a radially-outwardly facing surface 539 spaced apart radially from the radially-inwardly facing surface 537, and an outer surface 541 as shown in FIG. 16. The radially-inwardly facing surface 537 engages the second attachment feature 548, while the radially-outwardly facing surface 539 is engaged by the third setscrew 534. The outer surface 541 extends between and interconnects the surfaces 537, 539. The outer surface 541 of the plug 535 slides against a surface 583 of a hole formed in the carrier segment 554 in the illustrative embodiment.

In the illustrative embodiment, the third setscrew 534 is axially offset from the plug 535 as shown in FIG. 16. The plug 535 is axially aligned with the second attachment feature 548, while the third setscrew 534 extends into the carrier segment 554 axially forward of the plug 535 and engages the radially-outwardly facing surface 539.

The setscrew 534 is tightened or loosened to slide the plug 535 in hole of the carrier segment 554. As the setscrew 534 pushes on the plug 535, the surface 583 forces the plug 535 to react along the line of action of the hole in which the plug 535 slides.

In the illustrative embodiment, each attachment feature 546, 548 includes a base section 570, 571 a first mount post 572, 573, and a second mount post 574, 575 as shown in FIGS. 17 and 18. The base section 570, 571 extends radially outward from the shroud wall 544. Both the first mount post 572, 573 and the second mount post 574, 575 extend radially outward form the base section 570, 571. The second mount post 574, 575 is spaced apart circumferentially from the first mount post 572, 573.

The first and second setscrews 530, 532 are located circumferentially between the first mount post 572 and second mount post 574 of the first attachment feature 546 so that the first and second setscrews 530, 532 engages the base section 270 of the first attachment feature 546. The third setscrew 534 is located circumferentially between the first mount post 573 and the second mount post 575 of the second attachment feature 548 so that the third setscrew 534 engages the base section 271 of the second attachment feature 548.

A method for assembling the turbine shroud segment 522 may include several steps. To begin, the shroud segment 524 is located adjacent to the carrier segment 554. To locate the shroud segment 424 adjacent to the carrier segment 454, the pin holes formed in the attachment features 446, 448 are aligned with pin holes formed in the carrier segment 554.

In some embodiments, before the shroud segment 524 is located adjacent to the carrier segment 554, the plug 535 is inserted into the respective hole in the carrier segment 554. Once the plug 535 is in place, the shroud segment 524 may be located adjacent to the carrier segment 554 so as to insert the pins 556, 558.

The pins 556, 558 are then inserted axially into the carrier segment 554 and the attachment feature 546, 548 of the shroud segment 524 to couple the shroud segment 524 with the carrier segment 554. With the pins 556, 558 inserted, the shroud segment 524 is coupled to the carrier segment 554.

Next, the setscrews 530, 532, 534 are threaded into the carrier segment 554 to couple the setscrews 530, 532, 534 with the carrier segment 554. Each of the setscrews 530, 532, 534 are then engaged with the corresponding attachment feature 546, 548 to urge the shroud segment radially away from the carrier segment and minimize radial movement of the shroud segment relative to the carrier.

The first setscrew 530 may be tightened to engage the first attachment feature 546 of the shroud segment 524 in between the mount posts 572, 574. The second setscrew 532 may be tightened to engage the second setscrew 532 with the first attachment feature 546 of the shroud segment 524 at a location circumferentially spaced apart from the first setscrew 530. The third setscrew 534 may be tightened to engage the second attachment feature 548 of the shroud segment 524 circumferentially in between the mount posts 573, 575.

The present disclosure relates to a method for applying a radial inward force or bias force on a ceramic matrix composite shroud segment 24, 224, 324, 424, 524. Due to the differential pressure across the shroud segment 24, 224, 324, 424, 524, the shroud segment 24, 224, 324, 424, 524 may chatter due to the blade passing frequency or the blades 15 pushing radially outward on the shroud segment 24, 224, 324, 424, 524 during a rub event.

The retainer system 28, 228, 328, 428, 528 included in the turbine shroud segment 22, 222, 322, 422, 522 is configured to apply a radial inward force to the shroud segment 24, 224, 324, 424, 524 that may either overcome the proposed forces caused by the blades 15 or apply a damping effect that may counter the possibility of rigid body motion that would otherwise cause chattering.

In the embodiment of FIGS. 1-7, the retainer system 28 includes two bias members 30, 32. One bias member 30 is located over the first, or forward attachment feature 46 and the other bias member 32 is located over the second, or aft attachment feature 48. In the illustrative embodiment, the first bias member 30 includes grooves 66, 88 that form fingers on the ends 60, 62 of the bias member 30. The fingers extend around the attachment feature 46 to capture the bias member 30 and maintain the axial position. The grooves 66, 68 minimize movement axially while the circumferential size of the bias member 30 blocks the circumferential movement of the bias member 30. The grooves 66, 68 and fingers may also be applied to the second bias member 32.

In the embodiment of FIGS. 8-11, the bias members 230, 231, 232, 233 are located between the carrier segment 254 and the shroud segment 224 directly above the pins 256, 258. The bias members 230, 231, 232, 233 may be a wave spring, a rope seal, a canted coil spring, or other suitable bias member that would apply radial force to the shroud segment 224. In the illustrative embodiment, each of the bias members 230, 231, 232, 233 are located above one of the mount posts 272, 273, 274, 275.

In the embodiment of FIGS. 12 and 13, the bias members 334, 336 are located between the clevis feature, i.e. the support arms 386, 388 of the carrier segment 354, and the shroud segment 324. The bias members 334, 336 may be a rope seal, a canted coil spring, or another suitable bias member. The first or aft bias member 334 applies a force in the radial and axial directions. The second bias member 336 applies a force in only the radial direction.

The bias members 334, 336 may extend circumferentially along the full length of the segment 322. The bias members 334, 336 may allow the pressure in the cavity 355 to be varied and reduces the leakage. In the embodiment of FIGS. 14 and 15, the bias members 434, 436 apply a force in the radial and axial directions, while the remaining bias members 430, 431, 432, 433 apply a force in only the radial direction.

In the embodiment of FIGS. 16-18, the retainer system 528 includes setscrews 530, 532, 534 that are threaded through the carrier segment 554. The setscrews 530, 532, 534 are loaded against the attachment features 546, 548 of the shroud segment 524 to limit the motion of the shroud segment 524. In some embodiments, the retainer system 528 includes a plug 535 that slides relative to the carrier segment 554 and in pushed into engagement with the shroud segment 524 by the third setscrew 534.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
    a shroud segment comprising ceramic matrix composite materials, the shroud segment including a shroud wall that extends circumferentially partway around an axis to define a gas path boundary of the turbine shroud assembly and a first attachment feature that extends radially outward away from the shroud wall,
    a carrier comprising metallic materials and configured to support the shroud segment in position radially relative to the axis, the carrier including a carrier segment and a pin that extends axially into the carrier segment of the carrier and the first attachment feature of the shroud segment to couple the shroud segment to the carrier segment, and the carrier segment having a body and an axial location feature that extends circumferentially along and axially forward from the body and engages the first attachment feature of the shroud segment, and
    a retainer system including a first bias member that extends circumferentially at least partway around the axis, the first bias member located axially forward of the first attachment feature of the shroud segment and located radially between the shroud wall and the carrier segment so as to apply a first bias force to the shroud segment in a radially inward direction to minimize radial movement of the shroud segment relative to the carrier and in an axially aft direction to axially locate the shroud segment on the axial location feature of the carrier segment during use of the turbine shroud assembly.

2. The turbine shroud assembly of claim 1, wherein the body of the carrier segment includes an outer wall that extends circumferentially at least partway about the axis, a first support arm that extends radially inward from the outer wall, and a second support arm that extends radially inward from the outer wall and spaced apart axially from the first support arm to define a cavity that receives the first attachment feature of the shroud segment, and wherein the first bias member is located between the first support arm and the shroud wall.

3. The turbine shroud assembly of claim 2, wherein the first support arm is formed to include an engagement surface that engages the first bias member to cause the first bias member to urge the shroud segment both radially inward and axially aft.

4. The turbine shroud assembly of claim 2, wherein the retainer system further includes a second bias member that extends circumferentially at least partway around the axis, the second bias member located radially between the shroud segment and the carrier segment so as to apply a second bias force to the shroud segment, and wherein the second bias force applied by the second bias member is only in the radially inward direction.

5. The turbine shroud assembly of claim 4, wherein the shroud segment further includes a second attachment feature spaced apart axially from the first attachment feature that extends radially outward away from the shroud wall, the pin extends axially into the carrier segment, the first attachment feature, and the second attachment feature, and the second bias member is spaced axially forward of the first bias member and axially between the first and second attachment features.

6. The turbine shroud assembly of claim 4, wherein the shroud segment further includes a second attachment feature spaced apart axially from the first attachment feature that extends radially outward away from the shroud wall, the pin extends axially into the carrier segment, the first attachment feature, and the second attachment feature, and the second bias member is axially aligned with one of the first attachment feature and the second attachment feature of the shroud segment.

7. The turbine shroud assembly of claim 1, wherein the shroud segment further includes a second attachment feature spaced apart axially from the first attachment feature that extends radially outward away from the shroud wall, the pin extends axially into the carrier segment, the first attachment feature, and the second attachment feature, and the first bias member is located axially between the first and second attachment features.

8. The turbine shroud assembly of claim 7, wherein the retainer system further includes a second bias member that extends circumferentially at least partway around the axis, the second bias member located radially between the shroud segment and the carrier segment so as to apply a second bias force to the shroud segment, and the second bias member is spaced axially forward of the first bias member and axially between the first and second attachment features.

9. The turbine shroud assembly of claim 7, wherein the retainer system further includes a second bias member that extends circumferentially at least partway around the axis, the second bias member spaced axially forward of the second attachment feature of the shroud segment and located radially between the shroud segment and the carrier segment so as to apply a second bias force to the shroud segment in the radially inward direction and in the axial aft direction.

10. The turbine shroud assembly of claim 9, wherein the retainer system further includes a third bias member and a fourth bias member that each extend circumferentially at least partway around the axis, the third bias member located radially between the first attachment feature of the shroud segment and the carrier segment so as to apply a third bias force to the shroud segment, and the fourth bias member located radially between the second attachment feature of the shroud segment and the carrier segment so as to apply a fourth bias force to the shroud segment, wherein the third and fourth bias forces are only in the radially inward direction.

11. A turbine shroud assembly for use with a gas turbine engine, the turbine shroud assembly comprising
  a shroud segment including a shroud wall that extends circumferentially partway around an axis and a first attachment feature that extends radially outward away from the shroud wall,
  a carrier including a carrier segment and a pin that extends axially into the carrier segment of the carrier and the first attachment feature of the shroud segment to couple the shroud segment to the carrier segment, the carrier segment having a body and an axial location feature that extends circumferentially along and axially forward from the body and engages the first attachment feature of the shroud segment, and
  a retainer system including a first bias member that extends circumferentially at least partway around the axis, the first bias member located radially and axially between the shroud segment and the carrier segment and applies a first bias force to the shroud segment in a radially inward direction and an axially aft direction.

12. The turbine shroud assembly of claim 11, wherein the carrier segment includes an outer wall that extends circumferentially at least partway about the axis, a first support arm that extends radially inward from the outer wall, and a second support arm that extends radially inward from the outer wall and spaced apart axially from the first support arm to define a cavity that receives the first attachment feature of the shroud segment, and wherein the first bias member is located between the first support arm and the shroud wall.

13. The turbine shroud assembly of claim 12, wherein the retainer system further includes a second bias member that extends circumferentially at least partway around the axis, the second bias member located radially between the shroud segment and the carrier segment so as to apply a second bias force to the shroud segment.

14. The turbine shroud assembly of claim 13, wherein the shroud segment further includes a second attachment feature spaced apart axially from the first attachment feature that extends radially outward away from the shroud wall, the pin extends axially into the carrier segment, the first attachment feature, and the second attachment feature, and the second bias member is spaced axially forward of the first bias member and axially between the first and second attachment features.

15. The turbine shroud assembly of claim 11, wherein the shroud segment further includes a second attachment feature spaced apart axially from the first attachment feature that extends radially outward away from the shroud wall, the pin extends axially into the carrier segment, the first attachment feature, and the second attachment feature, and the retainer system further includes a second bias member axially aligned with one of the first attachment feature and the second attachment feature of the shroud segment.

16. The turbine shroud assembly of claim 11, wherein the shroud segment further includes a second attachment feature spaced apart axially from the first attachment feature that extends radially outward away from the shroud wall, the pin extends axially into the carrier segment, the first attachment feature, and the second attachment feature, and the first bias member is located axially between the first and second attachment features.

17. The turbine shroud assembly of claim 16, wherein the retainer system further includes a second bias member that extends circumferentially at least partway around the axis, the second bias member located radially between the shroud segment and the carrier segment so as to apply a second bias force to the shroud segment, and the second bias member is spaced axially forward of the first bias member and axially between the first and second attachment features.

18. The turbine shroud assembly of claim 16, wherein the retainer system further includes a second bias member that extends circumferentially at least partway around the axis, the second bias member spaced axially forward of the second attachment feature of the shroud segment and located radially between the shroud segment and the carrier segment so as to apply a second bias force to the shroud segment in the radially inward direction and the axial aft direction.

19. A method comprising
  providing a shroud segment, a carrier, and a retainer system, the carrier including a carrier segment and a pin, the carrier segment having a body and an axial location feature that extends circumferentially along and axially forward from the body, and the retainer system including a first bias member,
  locating the first bias member on a first radially-outwardly facing surface of the shroud segment,
  locating the shroud segment adjacent to the carrier segment so that the first bias member is located radially between the carrier segment and the first radially-outwardly facing surface of the shroud segment and the axial location feature of the carrier segment engages the shroud segment,
  inserting the pin axially into the carrier segment and the shroud segment to couple the shroud segment with the carrier segment, and
  applying a first bias force to the shroud segment in a radially inward direction to minimize radial movement of the shroud segment relative to the carrier and in an axially aft direction to axially locate the shroud segment on an axial location feature formed on the carrier segment.

20. The method of claim 19, wherein the retainer system further includes a second bias member and the method further comprising locating the second bias member on a second radially-outwardly facing surface of the shroud segment before locating the shroud segment adjacent to the carrier segment so that the second bias member is located radially between the carrier segment and the second radially-outwardly facing surface once the shroud segment is located adjacent to the carrier segment.

* * * * *